(12) United States Patent
Grossnickle et al.

(10) Patent No.: US 8,009,086 B2
(45) Date of Patent: Aug. 30, 2011

(54) SYSTEM AND METHOD FOR GEO-LOCATING A RECEIVER WITH REDUCED POWER CONSUMPTION

(75) Inventors: Peter C. Grossnickle, San Diego, CA (US); Heidi L. Buck, San Diego, CA (US); Gregory Fleizach, La Jolla, CA (US); Alan Fronk, Oceanside, CA (US); Matthew Fong, Sunnyvale, CA (US); Barry R. Hunt, San Diego, CA (US); Matthew Nicholson, San Diego, CA (US); Brian T. Williams, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/856,878

(22) Filed: Aug. 16, 2010

(65) Prior Publication Data
US 2010/0302099 A1    Dec. 2, 2010

Related U.S. Application Data

(63) Continuation of application No. 12/068,945, filed on Feb. 13, 2008, now abandoned.

(51) Int. Cl.
*G01S 19/40*    (2010.01)
*G01S 19/09*    (2010.01)
(52) U.S. Cl. ............... 342/357.23; 342/357.46
(58) Field of Classification Search ............. 342/357.46, 342/357.23
See application file for complete search history.

(56) References Cited

U.S. PATENT DOCUMENTS

| | | | |
|---|---|---|---|
| 5,594,453 A | 1/1997 | Rodal et al. | 342/357 |
| 6,243,648 B1 * | 6/2001 | Kilfeather et al. | 701/213 |
| 6,453,237 B1 * | 9/2002 | Fuchs et al. | 701/213 |
| 6,909,738 B2 | 6/2005 | Akopian et al. | 375/142 |
| 6,917,329 B2 | 7/2005 | Dougherty | 342/357.12 |
| 6,922,546 B1 | 7/2005 | Da et al. | 455/12.1 |
| 6,952,460 B1 | 10/2005 | Van Wechel et al. | 375/350 |
| 6,975,690 B1 | 12/2005 | Lin et al. | 375/326 |
| 7,002,515 B2 | 2/2006 | Ito et al. | 342/357.15 |
| 7,010,066 B2 | 3/2006 | Sullivan | 375/343 |
| 7,053,827 B2 | 5/2006 | Awata | 342/357.15 |
| 7,061,972 B1 | 6/2006 | Best | 375/150 |
| 7,071,871 B2 | 7/2006 | Horslund et al. | 342/357.06 |
| 2001/0033606 A1 | 10/2001 | Akopian et al. | 375/149 |
| 2003/0112179 A1 * | 6/2003 | Gronemeyer | 342/357.15 |

(Continued)

OTHER PUBLICATIONS

"GPS Pet Tracker" and "Hostage Tracking System" [online], Airtight Video, Copyright 1997-2004 [retrieved on Jan. 24, 2008], 8 pp., Retrieved from the Internet: http://www.airtightvideo.com/gps-tracking-systems.html.

(Continued)

*Primary Examiner* — Thomas Tarcza
*Assistant Examiner* — Fred H Mull
(74) *Attorney, Agent, or Firm* — Kyle Eppele; Arthur K. Samora

(57) ABSTRACT

A system and process for the geo-location of an asset given no a priori knowledge regarding time and location of the asset with minimized power consumption is disclosed. In the preferred embodiment, the system is accurate to about 30 meters CEP (50% circular error probable) using just a short segment, e.g., 100-200 ms, of digitized GPS L1 signal data.

18 Claims, 22 Drawing Sheets

U.S. PATENT DOCUMENTS

| | | | | |
|---|---|---|---|---|
| 2003/0139879 | A1 | 7/2003 | Krasner | 701/213 |
| 2003/0161543 | A1 | 8/2003 | Tanaka | 382/250 |
| 2003/0223477 | A1 | 12/2003 | Loomis et al. | 375/147 |
| 2007/0139264 | A1* | 6/2007 | Kangas | 342/357.12 |

OTHER PUBLICATIONS

"GPS 18 OEM" [online], Garmin, Copyright 1996-2008 [retrieved on Jan. 25, 2008], 5 pp., Retrieved from the Internet: https://buy.garmin.com/shop/shop.do?cID=158&pID=223.

"Package Tracking" [online], Global Tracking Technologies, Copyright 2004-2005 [retrieved on Jan. 24, 2008], 2 pp., Retrieved from the Internet: http//www.globaltrackingtech.com/package_tracking.html.

Kaisti, Kim, "GPS Receivers and LBS Applications" [online], Smart Positioning, Fastrax, (Mobile Monday) Nov. 7, 2005 [retrieved on Jan. 25, 2008], 19 pp., Retrieved from the Internet: http://media.mobilemonday.net/presentations/2005-11-07_Kaisti.pdf.pdf.

"XP-GPS System" [online], HunterPro, Copyright 1998-2006 [retrieved on Jan. 24, 2008], 4 pp., Retrieved from the Internet; http://www.gpshunter.com.

"UV-40 16 Channel Miniature GPS Receiver" [online], Laipac Technologies, Inc., Copyright 1999-2008 [retrieved on Jan. 25, 2008], 2 pp., Retrieved from the Internet: http://www.laipac.com/gps_uv40_eng.htm.

"LandAirSea 8100 Real Time GPS Tracking and Fleet Management System" [online], Copyright 2007 [retrieved on Jan. 24, 2008], 2 pp., Retrieved from the Internet: http://www.vehicle-tracking.com/products/8100.html.

"LR9805ST" [online], Leadtek, Copyright 1995-2008 [retrieved on Jan. 25, 2008], 2 p. Retrieved from the Internet: http://www.leadtek.com/eng/gps/overview.asp?pronameid=293&lineid=8&act=1.

"Mini-S3 Blutooth GPS" [online], EMTAC Wireless Solutions, Copyright 2007 [retrieved on Jan. 25, 2008], 2 pp., Retrieved from the Internet: http://www.emtac.com/minis3.html.

"Quantum GPS Collars" [online], Telemetry Solutions, [retrieved on Jan. 25, 2008], 4 pp., Retrieved from the Internet: http://www.telemetrysolutions.com/1280/wildlife-gps-collars.php.

Manandhar, Dinesh, et al., "Software-Based GPS Receiver A Research and Simulation Tool for Global Navigation Satellite System" [online], The University of Tokyo, [retrieved on Jan. 25, 2008], 6 pp., Retrieved from the Internet: http://www.qzss.org/Research/Paper/ACRS_2004_DM.pdf.

"GPS System Used by Police and Private Investigators" (T-Trac XS Internet GPS Car Tracking System) [online], Copyright 2007 [retrieved on Jan. 25, 2008], 7 pp., Retrieved from the Internet: http://www.brickhousesecurity.com/slimtrak-realtime-gps-tracking-car-locator.html.

"2006 GPS Receiver Survey," GPS World, 23 pp., Jan. 2006, http://www.highbeam.com/doc/1G1-155555809.html.

"Search, Detection, and Navigation Equipment Manufacture" [online], Hoover's, Inc., Copyright 2008 [retrieved on Jan. 28, 2008], 20 pp., Retrieved from the Internet: http://premium.hoovers.com/subscribe/ind/fr/callprep.xhtml?ID=242.

Engel, Frank, et al., "An Open GNSS Receiver Platform Architecture," The 2004 International Symposium on GNSS/GPS, Sydney, Australia, 10 pp., Dec. 6-8, 2004.

Dempster, A. G., "The UNSW/NICTA FPGA-Based GPS Receiver: A Tool for GNSS Research" [online], [retrieved on Jan. 28, 2008], 6 pp., Retrieved from the Internet: http://www.dynamics.co.nz/gpsreceiver.

"General Counterdrug Intelligence Plan—Appendix B—Counterdrug Scientific and Technological Needs" [online], [retrieved on Jan. 28, 2008], 7 pp., Retrieved from the Internet: http://www.fas.org/irp/ops/le/docs/gcip/appb.html.

"7th Circuit U.S. Court of Appeals Okays Surreptitious GPS Tracking by Police" [online], GPS Tracking Systems, Copyright 2005 [retrieved on Jan. 25, 2008], 13 pp., Retrieved from the Internet: http://gpstrackingsystems.biz/7th-circuit-us-court-of-appeals-okays-surreptitious-gps-tracking-by-police/25/.

"Ultra Small Real Time GPS Tracking Device" [online], Advance Security Products, Copyright 1992-2008 [retrieved on Jan. 25, 2008], Retrieved from the Internet: http://www.surveillance-spy-cameras.com/small-gps-tracking-device.htm, 1 p.

"Animal Tracking With GPS" [online], Toma Track, [retrieved on Jan. 25, 2008], 3 pp., Retrieved from the Internet: http://www.tomatrack.com/animal-tracking-with-gps-01.htm.

"Should I Use Lithium, Alkaline, Nicad, or NiMH Batteries in My GPS" [online], [retrieved on Jan. 25, 2008], 1 p., Retrieved from the Internet: http://gpsinformation.net/maihn/battry2.htm.

"GPS Asset Tracking Catches Thieves" [online], GPS Tracking Systems,, Dec. 23, 2006 [retrieved on Jan. 25, 2008], 5 pp., Retrieved from the Internet: http://gpstrackingsystems.biz/gps-asset-tracking-catches-thieves/19/.

"Tracking Movement of Cattle with Satellites" [online], United States Department of Agriculture (USDA), Agriculture Research Service, [retrieved on Jan. 25, 2008], 3 pp., Retrieved from the Internet: http://www.ars.usda.gov/is/AR/archive/aug02/cattle0802.htm.

"Covert GPS Vehicle Tracking Systems" [online], Copyright 1999-2007 [retrieved on Jan. 25, 2008], 4 pp., Retrieved from the Internet: http://www.covert-gps-vehicle-tracking-systems.com/.

"Differing Approaches to GPS Tracking of Wildlife" [online], GPS Tracking Systems, Nov. 3, 2006 [retrieved on Jan. 25, 2008], 5 pp., Retrieved from the Internet: http://gpstrackingsystems.biz/differing-approaches-to-gps-tracking-of-wildlife/11/.

"Laptop (Non-Functional) With Hidden Real-Time GPS Tracking" [online], DPL Surveillance Equipment, Copyright 1997-2008 [retrieved on Jan. 25, 2008], 3 pp., Retrieved from the Internet: http://www.dpl-surveillance-equipment.com/909180933.htm/.

"Extending the Capabilities of the BlackJack GPS Receiver for Earth Science Applications" [online], The University of Texas at Austin, Lightsey Research Group, Copyright 2005-2006 [retrieved on Jan. 25, 2008], 2 pp., Retrieved from the Internet: http://lightsey.ae.utexas.edu/research.php?view=16.

Hartsock, Andrew, "The Global Allure of GPS" [online] Agilis Systems, Dec. 18, 2006 [retrieved on Jan. 25, 2008], 3 pp., Retrieved from the Internet: http://www.agilissystems.com/news/industry-06-12-18.php.

Griggs, Kim, "Godwit Makes Huge Pacific Flight" [online], BBC News, Sep. 11, 2007 [retrieved on Jan. 25, 2008], 3 pp., Retrieved from the Internet: http://news.bbc.co.uk/2/hi/science/nature/6988720.stm.

"Uses of GPS in Law Enforcement and Police Work" [online], [retrieved on Jan. 25, 2008], 3 pp., Retrieved from the Internet: http://www.mapwatch.com/gps/gps-law-enforcement.shtml.

"GPS Tracking Law" [online], GPS Tracking Systems, Copyright 2005 [retrieved on Jan. 25, 2008], 7 pp., Retrieved from the Internet: http://gpstrackingsystems.biz/category/gps-tracking-law.

"Different GPS Wildlife Tracking Solutions" [online], GPS-Practive-and-Fun.com, [retrieved on Jan. 25, 2008], 5 pp., Retrieved from the Internet: http://www.gps-practice-and-fun.com/gps-wildlife-tracking.html.

"How Long Do Batteries Last" [online], GPS Search and Find, [retrieved on Jan. 25, 2008], 4 pp., Retrieved from the Internet: http://www.gpssearchandfind.com/gpsreceiver-gpssystem.html.

"Pet Tracking Collars Via GPS and GSM" [online], Environmental Studies, [retrieved on Jan. 25, 2008], 7 pp., Retrieved from the Internet: http://www.environmental-studies.de/products/pet-tracking/pet-tracking.html.

"Practical GPS Tests" [online], GPS-Practice-and-Fun.com, [retrieved on Jan. 25, 2008, 3 pp., Retrieved from the Internet: http://www.gps-practice-and-fun.com/gps-tests.html.

"QinetiQ Announces Smallest GPS Tracking Unit" [online], Engadget, Feb. 12, 2005 [retrieved on Jan. 25, 2008], 8 pp., Retrieved from the Internet: http://www.engadget.com/2005/02/12/qinetiq-annouces-smallest-gps-tracking-unit.

"School Uniforms May Get GPS Tracking" [online], Gizmodo, Aug. 21, 2007 [retrieved on Jan. 25, 2008], 5 pp., Retrieved from the Internet: http://uk.gizmodo.com/2007/08/21/school_uniforms_may_get_gps_tr.html.

"Sky Patrol GPS Car Tracking System" [online], GPS Tracking Systems, Sep. 4, 2007 [retrieved on Jan. 25, 2008], 5 pp., Retrieved from the Internet: http://gpstrackingsystems.biz/skypatrol-gps-car-tracking-system/78/.

"Quantum 6500 GPS Collar" [online], Telemetry Solutions, [retrieved on Jan. 25, 2008], 2 pp., Retrieved from the Internet: http://www.telemetrysolutions.com/1280/gps-collar-quantum-6500.php.

Whitford, Marty, "Thief Relief: Empowered by GPS and Cellular Technologies, New Asset-Tracking Systems Help Local Law Enforcement Combat Crime Rings and Recover Pilfered Property" [online], GPS World, Oct. 2004 [retrieved on Jan. 25, 2008], 6 pp., Retrieved from the Internet: http://findarticles.com/p/articles/mi_m0BPW/is_10_15/ai_n6338599.

"P-Trac Pro GPS+ Tracking Device Works Even Inside Buildings—Fleet Management" Brickhouse Security, Copyright 2007 [retrieved on Jan. 28, 2008], 7 pp., Retrieved from the Internet: http://www.brickhousesecurity.com/sendumgpspackage-trackerpt200.html.

"GPS/MET and More" [online], UNAVCO Research group, Apr. 4, 2000 [retrieved on Jan. 25, 2008], 4 pp., Retrieved from the Internet: http://www.ucar.edu/communications/quarterly/fall96/GPSGMET.html.

Mills, Cynthia, "Animal Tracking in the Virtual Age" [online], Copyright 2007 [retrieved on Jan. 25, 2008], 4 pp., Retrieved from the Internet: http://animal.discovery.com/fansites/wildkingdom/elephant/science/science/html.

Parkinson, K. J., et al., "FPGA Based GPS Receiver Design Considerations," The 2005 International Symposium on GNSS/GPS, Hong Kong, 9 pp., Dec. 8-10, 2005.

"Astro" [online], Garmin, Copyright 1996-2008 [retrieved on Jan. 28, 2008], 11 pp., Retrieved from the Internet: http://buy.garmin.com/shop/shop.do?pID=8576.

"Welcome to C.A.T.S.eye—Covert Asset Tracking System" [online], [retrieved on Jan. 28, 2008], 2 pp., Retrieved from the Internet: http://www.cats-eye.net/default.htm.

"GPS Tracking Products from Security Concepts" [online], Tracking the World, Copyright 2007 [retrieved on Jan. 28, 2008], 2 pp., Retrieved from the Internet: http://www.trackingtheworld.com/products.html.

"GPS Measurement Corrections for Geophysicists" [online], RADIUS, [retrieved on Jan. 29, 2008], 1 p., https://radius.rand.org.

Mumford, Peter J., et al., "Open GNSS Receiver Platform" [online], [retrieved on Jan. 29, 2008], 6 pp., Retrieved from the Internet: http://www.gmat.unsw.edu.au/snap/about/publications_year.htm.

Akopian, David, "A Fast Satellite Acquisition Method," Ion GPS 2001, Salt Lake City, Utah, pp. 2871-2881, Sep. 11-14, 2001.

"WorldTracker SMS: The Next Generation of Live GPS Tracking Devices" [online], Tracking the World, Copyright 2007 [retrieved on Jan. 29, 2008], 7 pp., Retrieved from the Internet: http://www.trackingtheworld.com/wtsms.htm.

"TerraSAR-X BlackJack Receiver Software Development and Testing" [online], Lightsey Research Group, Apr. 2006-Feb. 2008 [retrieved on Jan. 29, 2008], 3 pp., Retrieved from the Internet: http://tycho.csr.utexas.edu/research.php?view=7.

* cited by examiner

| | Word 1 | Word 2 | Words 3-9 | Word 10 |
|---|---|---|---|---|
| Subframe 1 | Sync | TOW | week no, clock correction | |
| Subframe 2 | Sync | TOW | Ephemeris | |
| Subframe 3 | Sync | TOW | Ephermeris | |
| Subframe 4 | Sync | TOW | Almanac, other corrections | |
| Subframe 5 | Sync | TOW | Almanac | |

GPS Nav message data frame, 5 x 10 x 30 = 1500 bits .
25 frames x 30 sec /frame = 12.5 min . for complete nav message Fig. 1
PRIOR ART

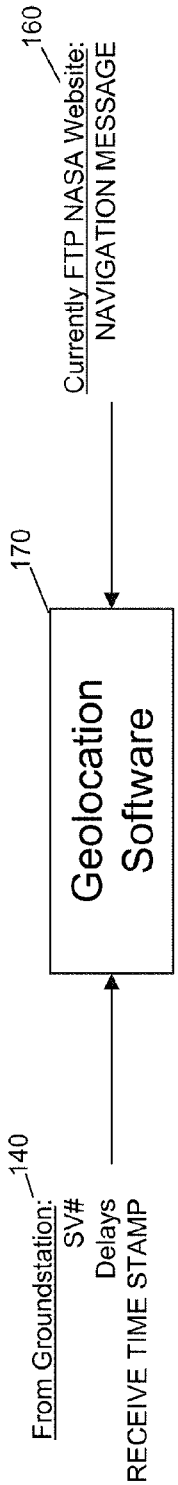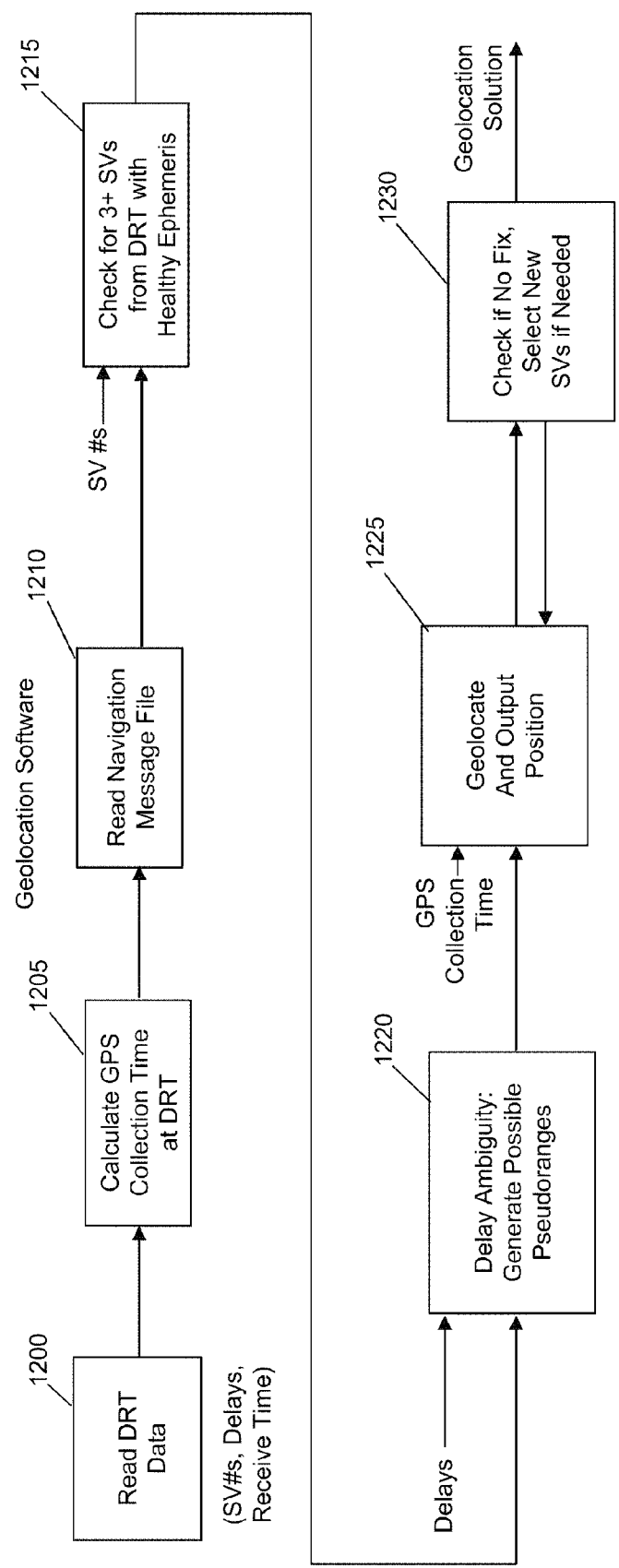
Figure 19a
Figure 19b

SYSTEM AND METHOD FOR GEO-LOCATING A RECEIVER WITH REDUCED POWER CONSUMPTION

CROSS REFERENCES TO RELATED APPLICATIONS

This application is a continuation of and claims priority to U.S. patent application Ser. No. 12/068,945, entitled SYSTEM AND METHOD FOR GEO-LOCATING A RECEIVER WITH REDUCED POWER CONSUMPTION, filed Feb. 13, 2008 now abandoned, which is incorporated herein in it's entirety by reference.

GOVERNMENT RIGHTS IN INVENTION

This invention was made with Government support under contract no. 01-D-1518/33 awarded by the Department of the Navy. The Government has certain rights in this invention.

BACKGROUND OF THE INVENTION

1. Field of the Invention

The present invention relates generally to the field of global positioning systems. More specifically, the present invention relates to components and methods useful for reducing power consumption in global positioning system receivers and improving processes for locating and tracking assets.

2. Description of the Related Art

The Global Positioning System (GPS) is used to, among other functions, determine location. Developed initially by the United States Department of Defense, the GPS is comprised of space vehicles or satellites (hereafter "SV"), a Master control facility and one or more receivers, usually referred to as GPS receivers. More particularly, there are 31 SVs that orbit the earth in approximately 12 hours. The SV orbits repeat virtually the same ground track once each day and repeat the same track and configuration over any point with reliable regularity. There are six orbital planes, several SVs per plane, equally spaced (60 degrees apart), and inclined at about fifty-five degrees with respect to the equatorial plane. Accordingly, a user located anywhere on the Earth will be visible to between five and eight SVs.

The Master Control facility (MC facility) is located at Schriever Air Force Base in Colorado. The MC facility monitors the SVs and measures signals from the SVs which are then incorporated into orbital models for each SV. Based on orbital models, precise orbital data (ephemeris) and SV clock corrections are computed for each SV and uploaded to the SVs. The SVs in turn transmit subsets of the orbital ephemeris data as part of a Navigation Message to GPS receivers using radio signals. The Navigation Message contains ephemeris and other parameters needed to compute a position estimate (receiver position and local clock error). A Navigation Message is formatted as shown in FIG. 1. The each SV transmits a Coarse/Acquisition (C/A) signal on the L1 frequency (1575.42 MHz). A Navigation Message continuously bi-phase modulates the L1 carrier at 50 bits/sec. This signal is then spread by a Gold code unique to each SV. The C/A code chip rate is 1.023 MHz. With 1023 chips per code epoch, the duration of a single epoch is exactly 1 ms. Thus there are 20 epochs per bit. All SVs transmit synchronously.

Referring to FIG. 1, The Navigation Message is a continuous 50 bits/second data stream modulated onto the carrier signal of every SV. It is a telemetry message, and the data is transmitted in logical units called frames. For GPS a frame is 1500 bits long, so it takes 30 seconds to be transmitted. Every SV begins to transmit a frame precisely on the minute and half minute, according to its own clock. Each frame is divided into five subframes, each subframe is 300 bits long. Subframes 1, 2 and 3 contain the high accuracy ephemeris and clock offset data. The content of these subframes 1, 2 and 3 is the same for a given satellite for consecutive frames for periods lasting as long as two hours. Subframe 1 contains second degree polynomial coefficients used to calculate the satellite clock offset. Subframes 2 and 3 contain orbital parameters. Subframes 4 and 5 are subcommutated, which means that consecutive subframes have different content. This data does repeat, but 25 consecutive frames of subframe 4 and 5 data must be collected before the receiver has all of the unique data being transmitted by the SV. An SV transmits the same data in subframes 4 and 5 until it is next uploaded, or usually for about 24 hours. Subframes 4 and 5 contain the almanac data and some related health and configuration data. An entire set of twenty-five frames (125 subframes) makes up the complete Navigation Message that is sent over a 12.5 minute period.

Each subframe is divided into 10 words of 30 bits each. Words 1 and 2 have the same format in every subframe. Word 1 is called the telemetry word. The first 8 bits in the telemetry word contain a sync pattern, used by the GPS receiver to help synchronize itself with the Navigation Message and thus be able to correctly decode the data. Word 2 contains the truncated Z-count. This is the time according to the SV's clock when the end of the subframe will be transmitted, with a scale factor of 6 seconds.

The MC facility uploads data to the SVs at approximately 24 hour intervals, sending the SV all of the data that the SV will transmit during the next 24 hours, plus data for extra days in case an upload is unexpectedly delayed. An upload contains roughly 16 subframe's worth of 1, 2 and 3 subframe data. An SV may begin transmitting new data, referred to as a cutover, after an upload at any time of the hour, but subsequent transmissions only occur precisely on hour boundaries. Each subframe 1, 2 and 3 data set is transmitted for no more than two hours with some transmitted for exactly an hour, some for exactly two hours and some (either immediately before or after an upload) broadcast for a period of less than two hours.

Subframe 1 contains a clock offset time-of-applicability (this is the fit time for the polynomial), and either subframe 2 or 3 contains an ephemeris time-of-applicability. The two time-of-applicability values are almost always the same, and for a cutover that begins on an hour epoch, the time-of-applicability values are almost exactly two hours later than the initial transmission time of the subframe 1, 2 and 3 data sets. Each of the three subframes also contains an index value which allows the receiver to verify that the three subframes are part of the same data set.

FIG. 2 is a schematic for a typical GPS receiver. The GPS receiver attempts to track all 5 to 12 SVs within view simultaneously, receiving the combined signals transmitted from the SVs at the RF front end 10. The data is digitized at an A/D converter 20. The reference Gold codes 30 are cross-correlated with the received data 40 and the signal delay information 50 is converted to a range estimate, which before any corrections are applied, is called pseudorange (PR), and is input to the central processing unit (CPU) 70. The Navigation Message is demodulated 60 and ephemeris data from the Navigation Message allows calculation of SV position. The Navigation Message also contains parameters used to correct the PRs. Given corrected PRs and SV positions, the CPU computes a position estimate 80. Four PRs and the positions of the four corresponding SVs allows solution of four range equations in four unknowns: user position in an earth-fixed coordinate system (x,y,z) and user clock error. If more than four PRs are available, a least squares solution can produce better accuracy. With this information the GPS receiver can also calculate distance traveled, time traveled, speed of travel, average speed, travel history, estimated time of arrival, etc. for navigational purposes. The GPS can be used for precise positioning using GPS receivers at reference locations providing corrections and relative positioning data for remote receivers. Surveying, geodetic control, and plate tectonic studies employ this method. Time and frequency dissemination, based on the precise clocks on board the SVs and controlled by the monitor stations, is another use for GPS. Astronomical observatories, telecommunications facilities, and laboratory standards can be set to precise time signals or controlled to accurate frequencies by special purpose GPS receivers.

On power-up, a GPS receiver must read all or part of the Navigation Message before outputting its first position estimate. This time-to-first-fix can be tens of seconds to minutes, depending on the receiver's initial state.

The SVs transmit two microwave carrier signals. The L1 frequency (1575.42 MHz) carries the Navigation Message and the standard position service SPS code signals. The L2 frequency (1227.60 MHz) is used to measure the ionospheric delay, but more importantly it carries encrypted navigation data for military precise positioning service PPS equipped receivers.

Two binary signals modulate the L1 and/or L2 carrier phase. The C/A Code (Coarse Acquisition) modulates the L1 carrier phase. The C/A code is a repeating 1.023 MHz Pseudo Random Noise (PRN) Code. This noise-like code modulates the L1 carrier signal, "spreading" the spectrum over a 1 MHz bandwidth. The C/A code repeats every 1023 chips (one millisecond). There is a different C/A code PRN (Gold code) for each SV. GPS satellites are often identified by their PRN number, the unique identifier for each pseudo-random-noise code. The C/A code that modulates the L1 carrier is the basis for the civil SPS. The P-Code (Precise) modulates both the L1 carrier, in quadrature with the C/A code, as well as the L2 carrier. The P-Code is a very long (seven days) 10.23 MHz PRN code. In the Anti-Spoofing (AS) mode of operation, the P-Code is encrypted into the Y-Code. The encrypted Y-Code requires a classified AS Module for each receiver channel and is for use only by authorized users with cryptographic keys. The P (Y)-Code is the basis for the PPS.

SUMMARY OF THE INVENTION

Summary of the Problem

The ability to determine the position of an asset, e.g., person, animal, equipment, on the earth is important and valuable to everyone from pet owners to the military. GPS capabilities have provided this functionality through the use of remote units which incorporate GPS receivers for reporting the position of the asset, but at a relatively high power cost. Typical remote units or data recovery transmitters (DRTs) power up, compute and upload position, and then power down. On each report cycle, significant energy is consumed during the GPS receiver's time-to-first-fix. This energy use limits DRT mission life and/or number of report cycles.

Accordingly, there is a need for a GPS system that requires reduced energy consumption per fix, while still providing accurate position estimates.

Summary of the Solution

The preferred embodiments of the present invention describe a system and process for the geo-location of a DRT given no a priori knowledge regarding time and location of the DRT with minimized power consumption. In the preferred embodiment, the system is accurate to about 30 meters CEP (50% circular error probable) using just a short segment, e.g., 100-200 ms, of digitized GPS L1 signal data.

The system and process include acquisition of inherently low power GPS signals using a short acquisition data window, e.g., 8 ms, wherein the system performs non-coherent integration over the entire acquisition data window. Bit transitions are transparent to this process. Thus maximum processing gain is achieved for better sensitivity to weak signals The system and process employ an ambiguity matrix approach which allows a fixed frequency search step size (1 kHz), regardless of the acquisition data window size. Older methods require the frequency search step size be coupled to the inverse of the integration time; as this integration time grows, the frequency step size shrinks; smaller frequency step sizes mean that more steps are needed to cover a desired frequency search range, thus incurring a larger processing burden.

The system and process employ a two stage acquisition process which minimizes computational cost. The initial search is over a set of frequencies roughly 1 kHz apart. This is done using input data, sampled at 4.092 MHz and decimated by 4 to 1.023 MHz. For detected SVs, this is followed by an estimate of coarse delay using data sampled at the higher 4.092 MHz rate.

The system and process utilize delay estimated from a least-mean-square (LMS) fit to sequential bit delays. This provides the following advantages: minimizes the variance of the fine delay estimate by implementing coherent integration over the track data window, typically 160 ms; removing effect of bit transitions; estimating fine delay over a set of bits, referenced back to the start of data, thus accommodating Doppler induced precession of code delay relative to a reference. Older techniques use tracking loops to track this delay. These track loops typically require longer data windows to estimate delay.

The output of the processing at the DRT, for each SV acquired and tracked, is delay from the start of data to the first bit boundary, which relates to the PR from the DRT to the SV.

The system and process utilize an upload filter which minimizes DRT transmit energy by selecting a subset of acquired SVs and their respective delays for upload, and reducing the number of bits to be uploaded by limiting precision and utilizing a sophisticated message structure. This technique reduces energy use without a significant degradation in position estimate accuracy.

The data that the DRT uploads is downloaded by a remote Geo-Location Processor. It uses the set of time delays to first bit boundary among SV signals arriving at a DRT, a GPS Navigation Message database, and the time of data collection at the DRT (to be calculated from a set processing time at the DRT and an estimated link latency).

BRIEF DESCRIPTION OF THE FIGURES

FIG. 1 illustrates the prior art GPS Navigation Message format;

FIGS. 19a and 19b illustrate general and detailed processes for receiving SV and associated delay information and outputting an estimate of the DRT's position according to an embodiment of the present invention;

DETAILED DESCRIPTION OF THE PREFERRED EMBODIMENTS OF THE PRESENT INVENTION

The following is a list of acronyms and abbreviations with corresponding meanings that are used throughout this disclosure.

Figure 2:
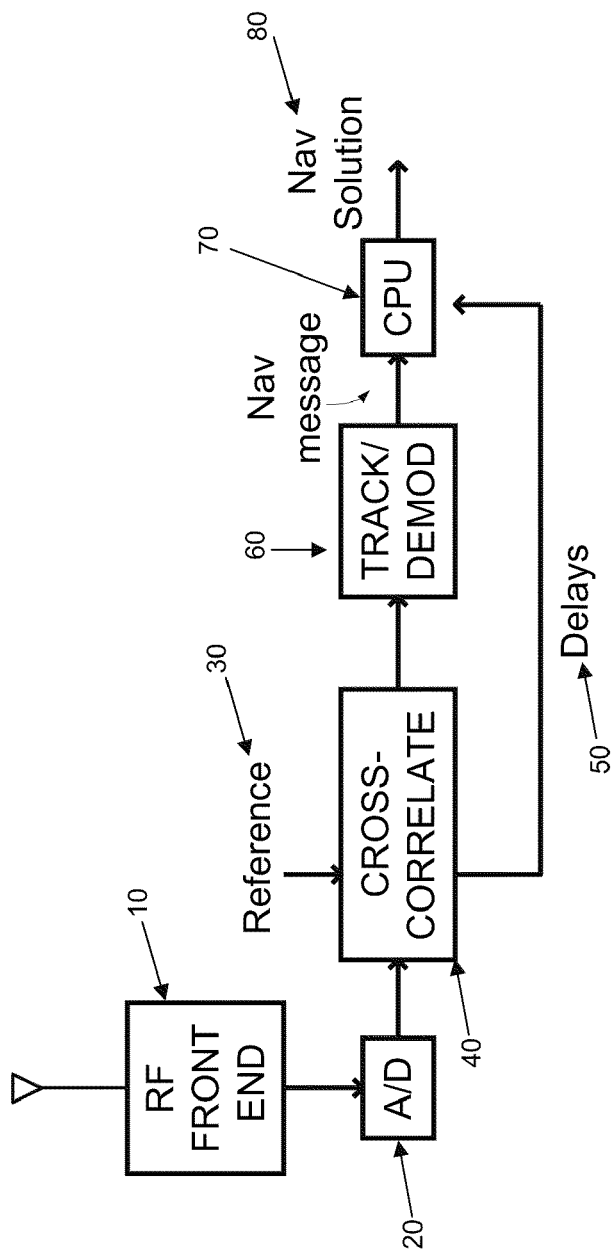
FIG. 2 illustrates a prior art GPS receiver.
Figure 3:
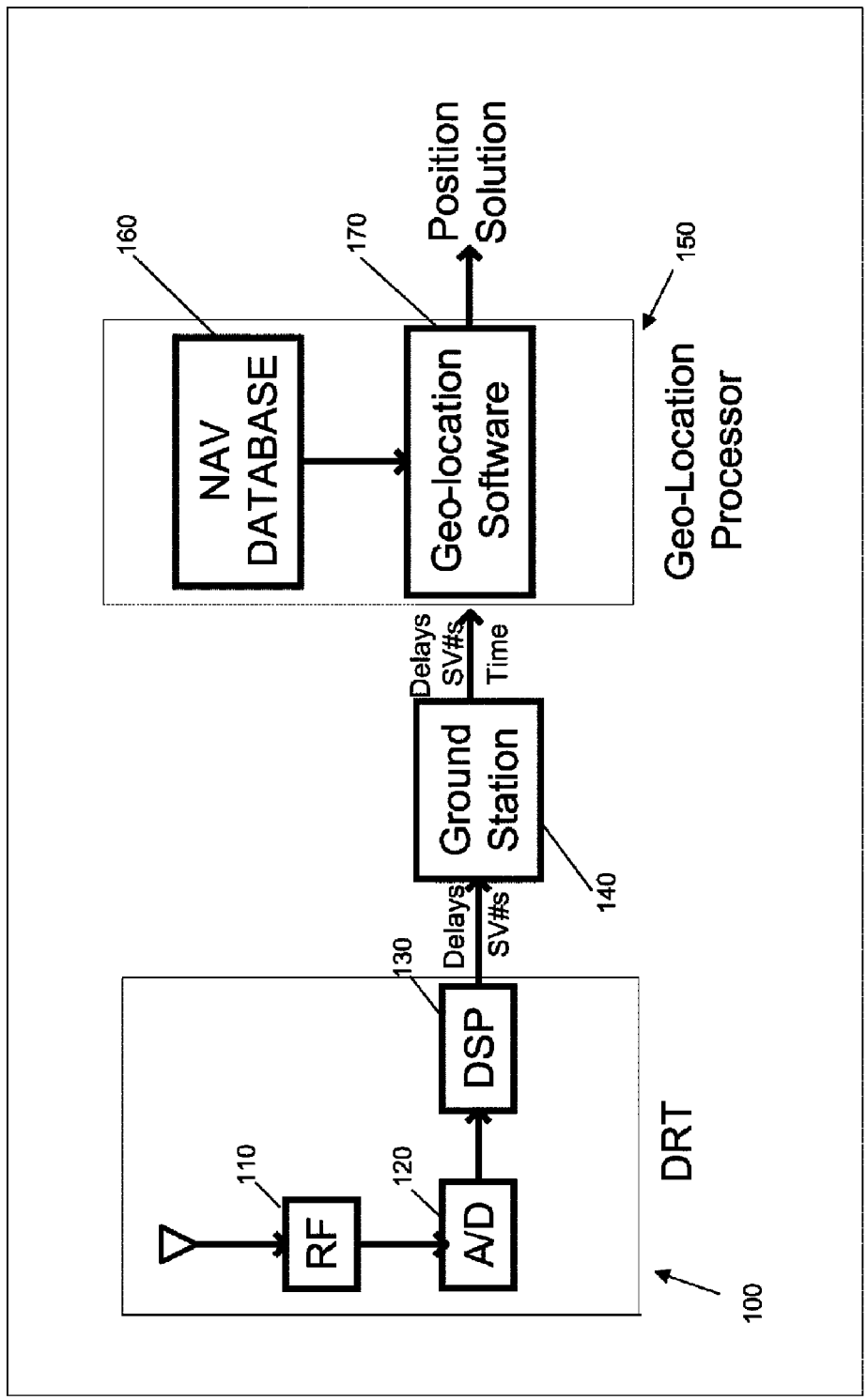
FIG. 3 illustrates a geo-location system according to an embodiment of the present invention.

A/D analog-to-digital converter
AM ambiguity matrix
BIT bit
C/A Coarse/Acquisition signal
CEP 50% circular error probable
CIC cascaded integrator-comb filter
CIRC circular
COL or COLS columns
CONJ conjugate
CORR or corr correction
D data
dec decimation
Demoded demodulated
DER delay error ratio
DRT data recovery transmitter
DSP digital signal processor
FFT Fast Fourier Transform
FLIP flip
FREQ or freq frequency
GEN generation
GET get
GLA Geo-Location Algorithm
GLP Geo-Location Processor
GLS Geo-Location Software
GPS Global Positioning System
IF intermediate frequency
IFFT inverse Fast Fourier Transform
Imag Imaginary
LMS least mean square
MAG magnitude
MAX maximum
meas measured
MIN minimum
MOD modulo
MSB most significant bit
NO or no number
PC personal computer
PMR peak-to-mean ratio
PR pseudorange
pwr power
QUAD quadratic
REF reference
RMS or rms root mean square
samp sample
sec second or seconds
SLIP or slip slip or slippage
SNR signal to noise ratio
SQ square or squared
SUM or summ sum or summary
SV space vehicle
SYM or sym symbol
TDOA time difference of arrival
THRES threshold
VEC or vec vector
W with
XC cross-correlation Referring to FIG. 3, in a preferred embodiment of the present invention, DRT energy consumption associated with geo-location is reduced by splitting the GPS processing load between a DRT 100 and a central Geo-Location Processor (GLP). As shown in FIG. 3, in accordance with the preferred embodiment, the DRT 100 includes only the RF receiver 110 (including circuitry), the A/D converter 120 and some a digital signal processing capabilities using a appropriate circuitry (DSP) 130. At ground station 140, the bulk of the processing for determining a position estimate for the DRT is performed with Geo-Location Processor 150 which includes navigation database 160 and geo-location software 170.

Further to the preferred embodiment, in the general process flow, the DRT 100 only calculates an estimate of C/A signal delays. The DRT powers up the RF receiver circuitry 110, collects a snippet of digitized L1 signal data, ranging from 100 to 200 ms in length and then powers down the RF circuitry. The L1 signal is digitized at the A/D converter 120 and processed at the DSP 130 to extract a set of relative signal delays, one for each SV acquired. These delays and associated SV identification numbers, called here the Remote Data Set, are then uploaded to the Geo-Location Processor 150 via the Ground Station 140. Upon receipt of the Remote Data Set from the DRT, the Geo-Location Processor 150 backs out the data collection start time at the DRT and uses parameters from the navigation database 160 to compute a position estimate for the DRT. The Navigation Database 160 is populated by data downloaded from, e.g., passing SVs via a commercial GPS receiver or via an internet connection to some remote source, e.g., a NASA public FTP (File transfer protocol) site.

To compute a position estimate, the Geo-Location Processor must know the data collection start time. It is assumed that the DRT will not have an accurate clock onboard. However on the DRT, the time between the start of data collection and the start of Remote Data Set upload is fixed. The clock inaccuracy in the duration of such a small fixed period (i.e., minutes) is negligible. So if the Ground Station notes the arrival time of the upload, then it can back out the data collection start time, within the uncertainty of transmission link latency. Simulations have shown that a link uncertainty time of +/−10 ms results in a RMS geo-location error of less than 4 m.

Figure 4:
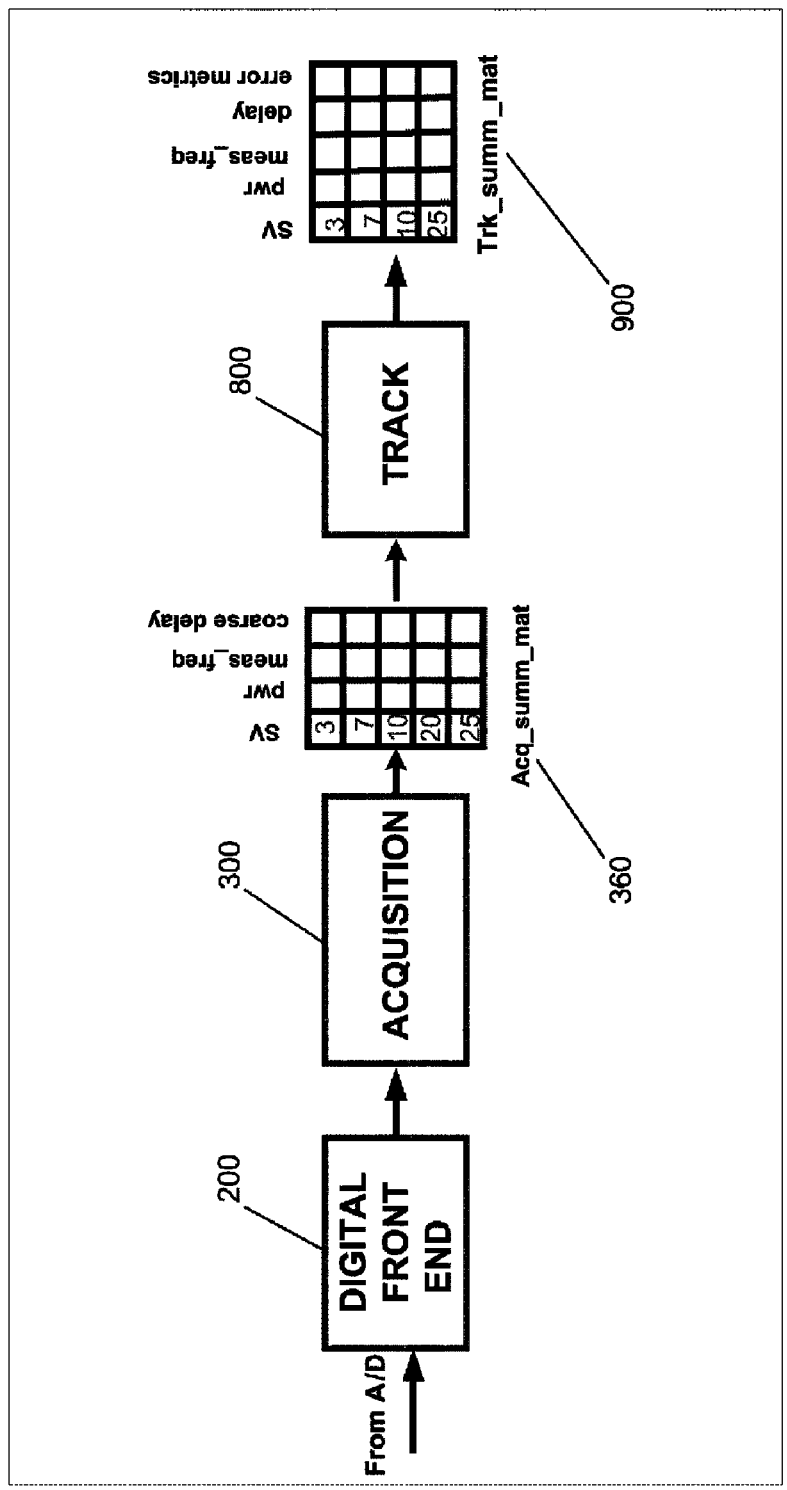
FIG. 4 illustrates at a high level a process for determining SV delays according to an embodiment of the present invention.
Figure 5:
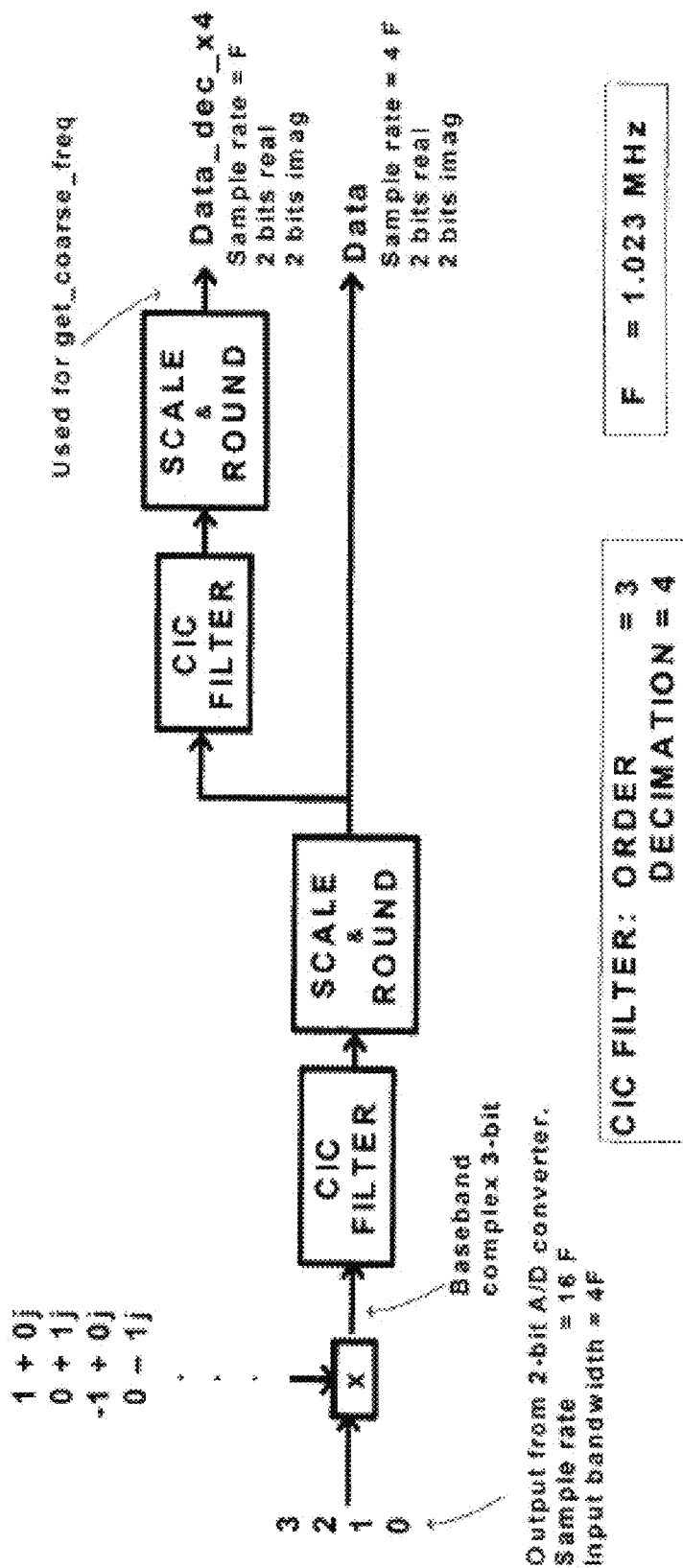
FIG. 5 illustrates a process for data decimation at the RF front end according to an embodiment of the present invention.

The two main functions comprising DRT processing are acquisition 300 and track 800 as shown in FIG. 4. Acquisition takes data from the digital front end 200 and detects SVs and extracts their coarse delays and measured frequency output as an acquisition summary matrix (Acq_summ_mat) 360. Track estimates the delay for each SV detected output as a track summary matrix (Trk_summ_mat) 900. The measured frequency found in the acquisition section is the apparent frequency offset of the L1 signal carrier; it is caused by the combined effects of Doppler and A/D clock error. Coarse delay is the number of samples until the first symbol. In the following description and corresponding figures, the word 'symbol' refers to a 1 ms, 1023 chip, GPS C/A code epoch. The RF front end (FIG. 3 reference 110) translates a 2 MHz band, centered at the GPS L1 frequency (1575.42 MHz), to an IF of 4×1.023 MHz. A unipolar two-bit analog-to-digital converter (A/D) samples this signal at 16×1.023 MHz. Thus the IF signal is centered at exactly ¼ of the sample rate. The digitized IF signal samples are translated to complex baseband signal samples via multiplication by the prior art sequence shown in FIG. 5. Following the translation to baseband, a 3$^{rd}$ order cascaded-integrator-comb (CIC) filter band limits and decimates by 4 the baseband data. The result is a 4×1.023 MHz sample rate, complex data, band limited to about 2 MHz (one-sided). This data is scaled and rounded to 2 bits real and 2 bits imaginary. Alternatively, the sample rate could be varied, for example a sample rate of 4.096 MHz would mean 4096 samples per symbol, a convenient power of two. One skilled in the art recognizes that there are variations to the sample rate that are well within the scope of the present invention.

As described further below, the get_coarse_freq routine of the acquisition process uses data sampled at a reduced rate in order to reduce the computational complexity. To provide data for this process, a secondary CIC filter follows the first, as well as another scaling and rounding operation. The result is complex data sampled at 1.023 MHz and band limited to about 0.5 MHz (one-sided), 2 bits real and 2 bits imaginary. The 2$^{nd}$ CIC filter is identical to the CIC filter mentioned above.

Figure 6:
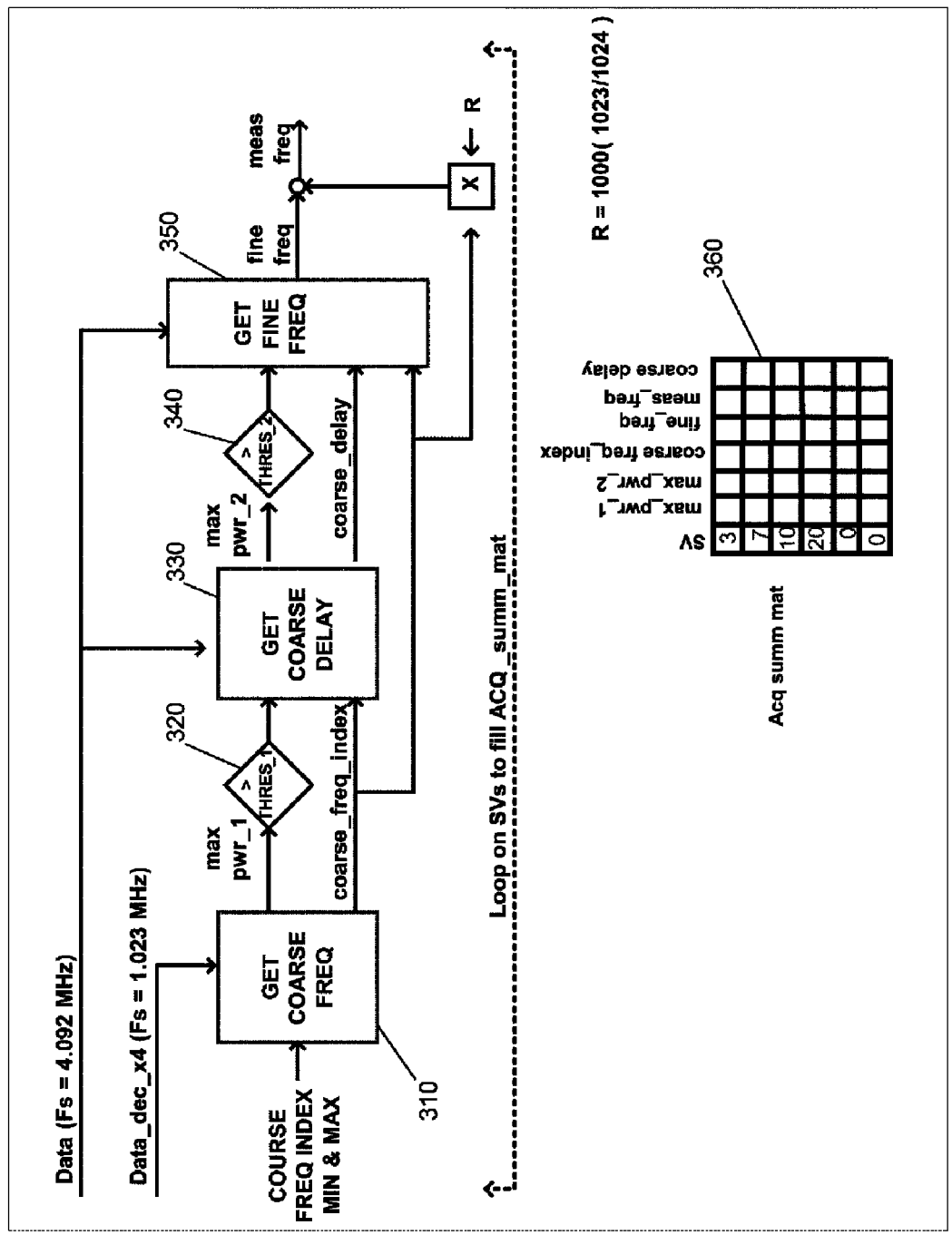
FIG. 6 illustrates a process for the DRT acquiring SVs and storing the results in an acquisition summary matrix according to an embodiment of the present invention.

The exemplary acquisition process 300 shown in FIG. 6 and described below, ranges over all operational GPS SVs. For each SV the "get coarse frequency" function (get_coarse_freq) 310 iterates over an integer number of coarse frequency (coarse_freq) indexes. The frequency corresponding to each index is coarse_freq=coarse_freq_index×{1000(1023/1024)}.

The range of coarse freq indices (individually "coarse_freq_index") is −10:+10. This covers about +/−10 kHz. Typically the GPS Doppler range is only +/−5 kHz, but this range is expanded to +/−10 kHz to accommodate RF front end clock offset. The "get_coarse_freq" function 310 outputs the maximum cross-correlation power, "max_pwr_1," 320 over the range of coarse freq indices and the corresponding coarse_freq_index. If this power exceeds a threshold determined experimentally to maximize the SVs that will pass the next phase of acquisition, the process proceeds to the steps for "getting coarse delay" (get_coarse_delay) 330. Note that get_coarse_freq uses Data_dec_x4, with a 1.023 MHz sample rate as described above, for faster execution. The "get_coarse_delay" function 330 returns the coarse_delay (the number of samples to the first symbol), and a second maximum cross-correlation power, "max_pwr_2" 340. If this power exceeds a second threshold determined experimentally to maximize the SVs that will pass the tracking phase of DRT processing, the steps for "getting fine frequency" (get_fine_freq) 350 are executed. The "get_fine_freq" function 350 estimates a fine frequency, fine_freq, relative to coarse_freq. So measured_freq=fine_freq+{coarse_freq_index×1000 (1023/1024)}, wherein measured_freq is "measured frequency." The results of this process are stored in the acquisition summary matrix, "Acq_summ_mat" 360, which is input to the track process described further below.

The ambiguity matrix (AM) approach to detection is used in both get_coarse_freq and get_coarse_delay. Acquisition is the most computationally intensive part of GPS processing; it requires a search over both time (or chip phase) and frequency. In a preferred embodiment of the present invention, the acquisition process utilizes the ambiguity matrix (AM), described below. The row number of the AM peak corresponds to delay while the column number corresponds to frequency offset. This is similar to the 2-D ambiguity function in radar; one dimension is delay, the other frequency offset. Thus the name ambiguity matrix.

The usual L1 C/A signal acquisition process steps over a range of frequencies. Typically a set of 1 ms symbols is cross-correlated (XC) with a reference. Consider an 8 symbol data set cross-correlated with an 8 symbol reference. The frequency step size is typically the inverse of the integration time; here 125 Hz for 8 symbols. Searching over say +/−5 kHz would then require 80 steps of 125 Hz each. As integration time grows, computational burden grows rapidly, both because of the reduced frequency step size as well as increased XC length.

Figure 7:
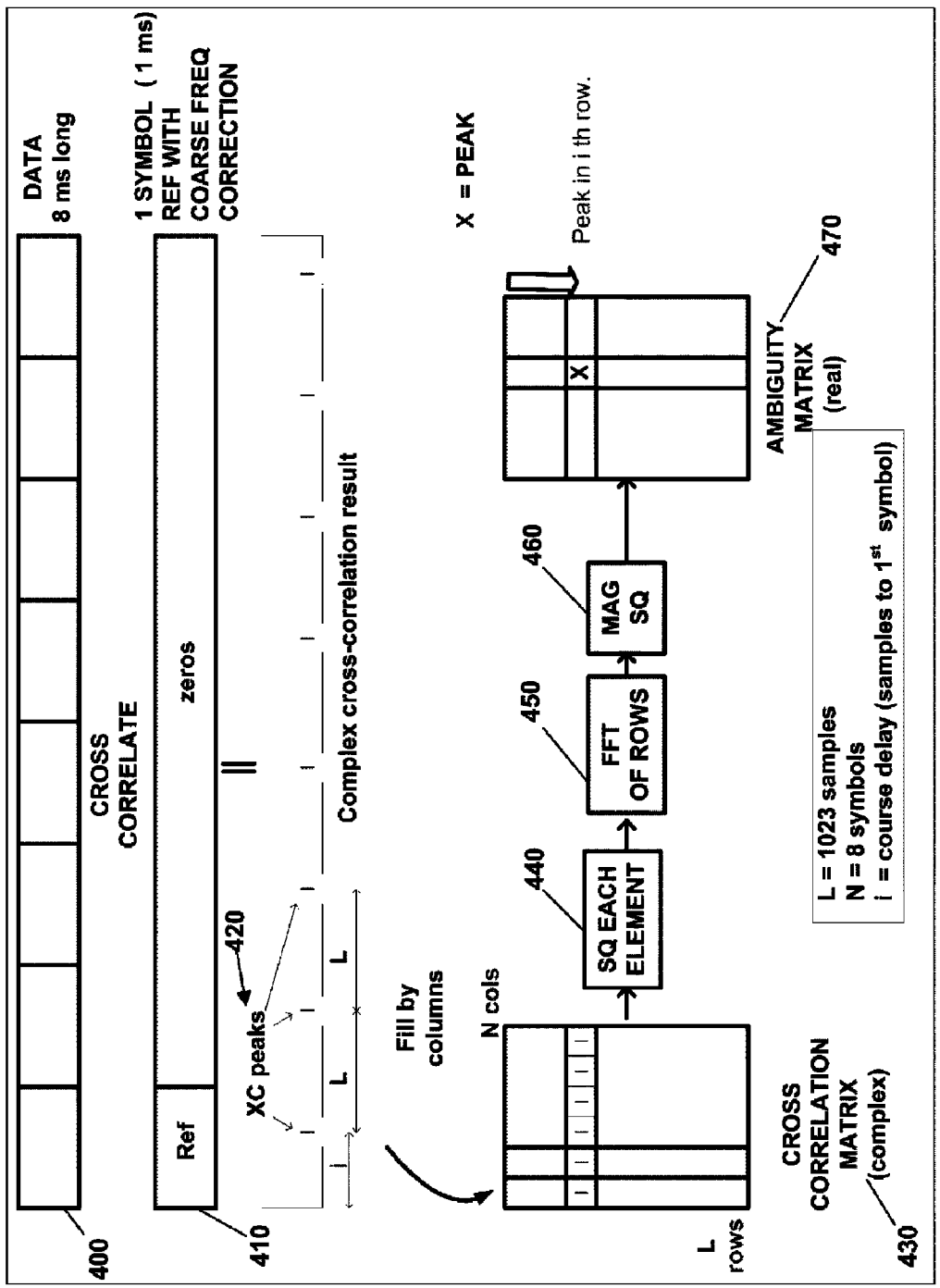
FIG. 7 illustrates how the ambiguity matrix approach, used for acquisition at the DRT, works according to an embodiment of the present invention.

Referring to FIG. 7, the approach used here involves XC of a data segment 400, about 8 ms long, with a single symbol (1 ms) reference 410. Frequency step size is 1 kHz, the inverse of the 1 ms reference, no matter the length of the data segment. This approach is possible because successive GPS C/A code epochs (symbols) are identical. Let the input data be sampled at 1023 samples per 1 ms epoch (symbol) or 1 sample per chip. The result is 8×1023 data samples being cross-correlated with a single symbol reference, 1023 samples long, also 1 sample per chip. The XC result is poured by columns into the 1023×8 XC matrix 430. This causes the XC peaks for each data symbol to lie along the same row in the XC matrix. Next, the elements of the XC matrix are squared 440 and the FFT (Fast Fourier Transform) of each row is taken 450. The magnitude squared 460 of the FFT of each row of the XC matrix is the AM 470. For most rows of the XC matrix, the FFT over rows has no effect, as elements of these rows are noise. However, for the row of the XC matrix containing XC peaks, the FFT over this row integrates these peaks. The squaring operation prior to the FFT removes possible 180 degree phase shifts due GPS bit transitions. An alternative is to double the phase of these complex numbers. These phase shifts would reduce integration gain. The row number of the peak in the AM, with an initial index of 1, corresponds to delay in samples to the start of the $1^{st}$ symbol, i.e., "coarse_delay." This method allows for a reduction in the number of frequencies searched because of the fixed frequency search step size, e.g., about 1000 Hz; avoids long FFTs and allows for detection of low level signals while minimizing the duration of data used for acquisition. This method is possible due to the nature of the GPS signal structure, i.e., repeated, unmodulated symbols with squaring operation to remove bit modulation, and a nominal integer number of samples per symbol. One skilled in the art recognizes that the data segments may vary in length, longer to accommodate weaker signals or shorter for faster acquisition of stronger signals.

Figure 8:
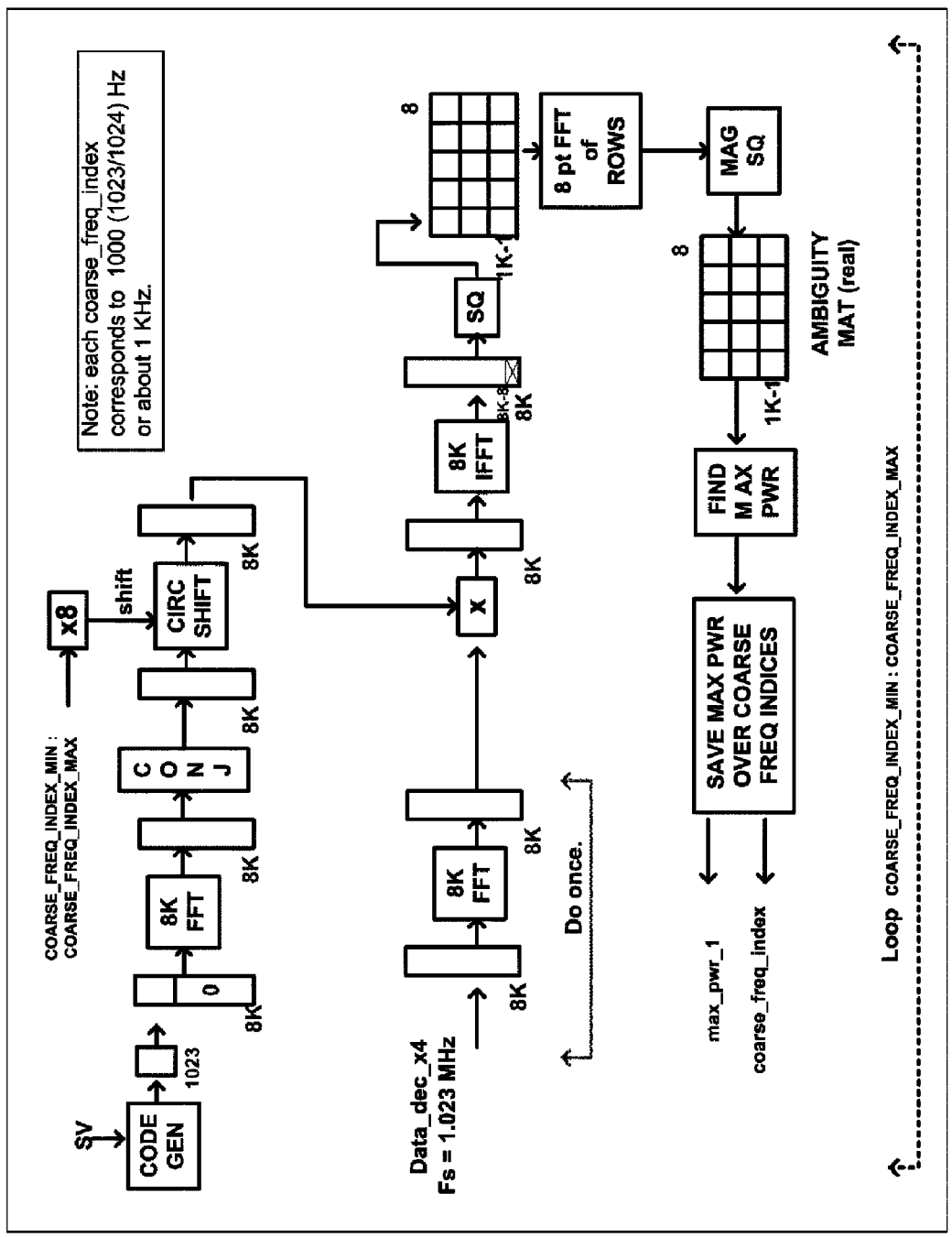
FIG. 8 illustrates a process for estimating coarse frequency according to an embodiment of the present invention.

FIG. 8 illustrates the "get_coarse_freq" process. For a particular SV, the process iterates over a range of coarse freq indices −10:+10. An index of 1 corresponds to a frequency of 1000×(1023/1024) Hz, or about 1 kHz. To reduce execution time, get_coarse_freq operates on Data_dec_x4. This is Data sub-sampled from the nominal 4.092 MHz to 1.023 MHz or 1 sample per chip, as described previously.

For each coarse freq index, 8K data samples, where K=1024, are cross-correlated with a reference. This reference is adjusted by the coarse frequency corresponding to the current coarse_freq_index. The desired frequency search step size is about 1 kHz. A circular shift of the FFT of the reference effects a frequency shift. Each frequency bin is (sample rate)/(no. of FFT bins)=1.023 MHz/8×1024 wide. So a shift of 8 bins results in a frequency shift of 8×(1.023 MHz/(8×1024)) or 1000×(1023/1024) Hz, or about 1 kHz. The reference is 1023 samples long or one sample per chip of the Gold Code, for the current SV. The XC is performed by multiplying the 8K FFT of the data with a shifted version of the FFT of reference, padded with zeros to 8K, and then taking the inverse FFT (IFFT). The first [8K−8] points of the 8K XC result (the 8K IFFT output) are squared and poured into the [1K−1] by 8 XC matrix by columns. Taking the FFT of each row and then the magnitude squared produces the AM. As discussed, the squaring operation of the XC before the 8 point FFT result removes possible 180 degree phase shifts between 2 symbols. The get_coarse_freq function returns the maximum AM power (max_pwr_1), over the range of coarse frequency indices, and the corresponding coarse_freq_index.

Figure 9:
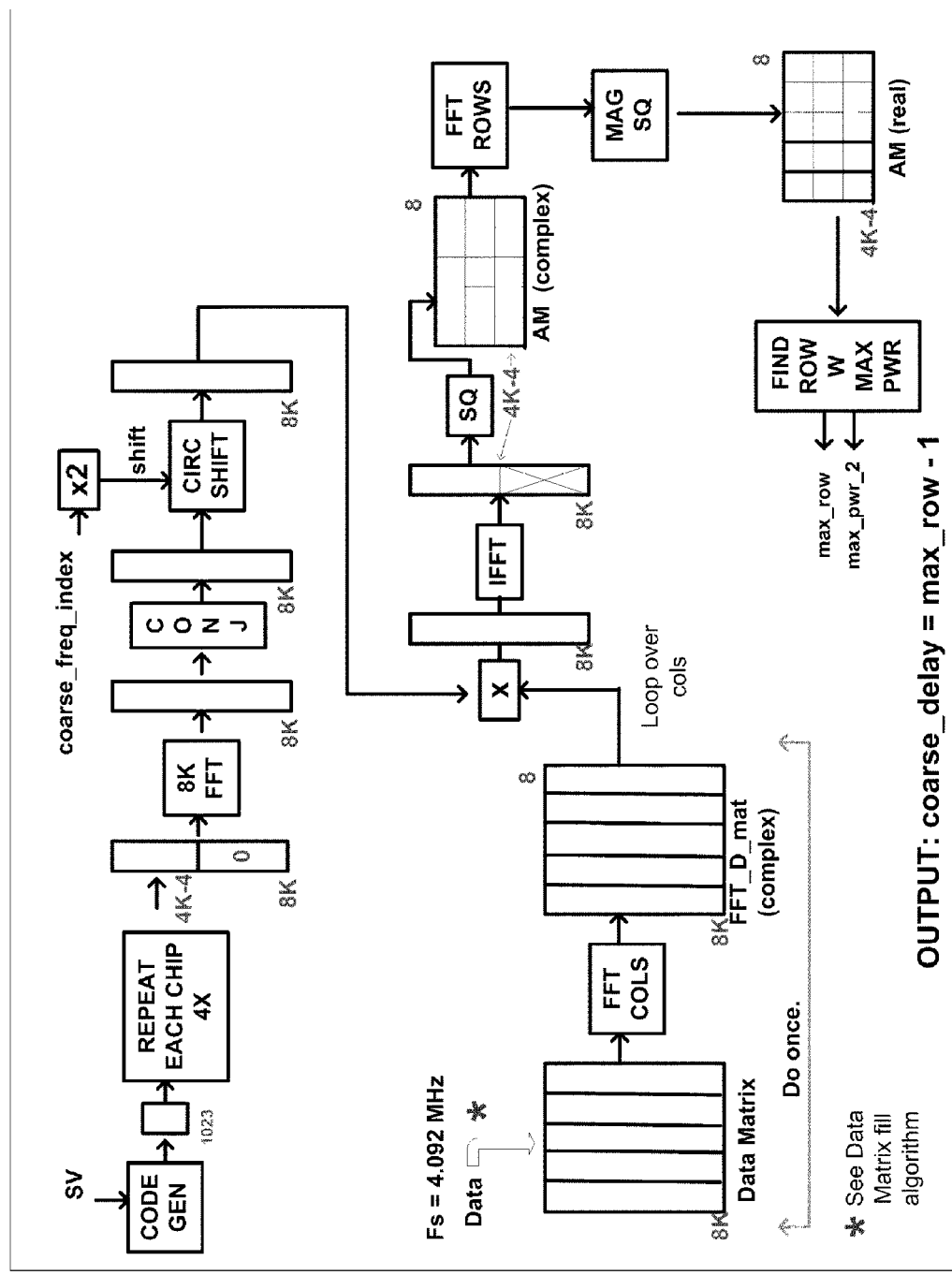
FIG. 9 illustrates a schematic of a process for estimating coarse delay using coarse frequency according to an embodiment of the present invention.

Upon exiting get_coarse_freq, coarse_freq_index and max_pwr_1 are known. If max_pwr_1 exceeds a threshold, get_coarse_delay is executed. The coarse_delay is the number of samples to the first symbol boundary. Referring to FIG. 9, the input to get_coarse_delay is Data, sampled nominally at 4.092 MHz or 4 samples per chip. The reference is generated by taking the 1023 chip Gold Code for the current SV and repeating each chip 4 times for 4 samples per chip or a total of 4K−4 samples.

This process essentially cross-correlates [8(4K−4)] data samples with a frequency adjusted reference, [4K−4] samples long, and pours the squared result by columns into the [4K−4] by 8 XC matrix. An FFT of the rows, followed by a magnitude square operation, creates an AM. The row number, counting from zero, with the greatest power, corresponds to coarse_delay.

This process is essentially the same as the previous get_coarse_freq except:
1. It starts with a known coarse_freq_index.
2. The input sample rate of Data is 4 times that used in get_coarse_freq.
3. The output is coarse_delay=row number, counting from zero, with max power.

To avoid large FFTs, the XC is done via the overlap-and-save-method. Conceptually, two adjacent [4K−4] data sections, or [2(4K−4)] samples, are cross-correlated with a [4K−4] ref padded to [2(4K−4)] and the first (4K−4) of the XC result saved. This is repeated, moving forward in the data, in [4K−4] steps. In practice, all FFTs are 8K long; the [4K−4] ref is padded to 8K and 8K of data is used at each step.

Alternatively, the overlap and save method used to effect XC as described with respect to FIG. 7 may be accomplished using a different method. For example, a single cross correlation of the 4092 sample reference with the entire 8×4092 data segment could be used at the expense of larger FFTs.

Figure 10:
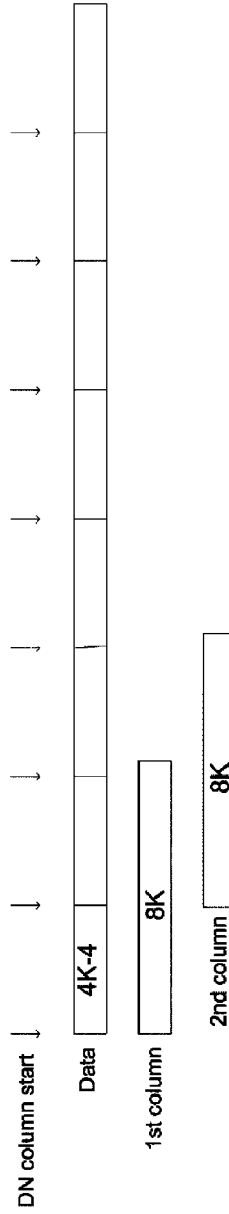
FIG. 10 illustrates an algorithm for filling the data matrix in FIG. 9 according to an embodiment of the present invention.

As with get_coarse_freq, the reference is frequency adjusted by a circular shift of its FFT. Here the FFTs are padded out to 8K so a shift of 2 corresponds to 2×(4.092 MHz/8K) or 1000(1023/1024) Hz or about 1 kHz. Thus the factor of 2 before the circular shift. At the start of the get_coarse_delay process, the Data Matrix is filled by columns according to the algorithm described in FIG. 10. Each column starts on a [4K−4] boundary and is 8K long. The FFT of each column is then taken to form a column of the FFT_D_mat. Looping over the 8 columns of FFT_D_mat, each column is multiplied by the shifted FFT of the reference and the IFFT taken. The top [4K−4] is squared, to remove bit transitions, and saved in a column of the [4K−4] by 8 XC Matrix. An alternative is to double the phase of these complex numbers. As before, the magnitude squared of the FFT of rows of the XC Matrix becomes the AM. The function finds the row containing the maximum element in the AM. It returns coarse_delay as the number of this row, assuming row numbers start with zero. The routine also returns the maximum power as max_pwr_2. Though computationally intensive, this function need only be executed once for each SV whose max_pwr_1, from the get_coarse_freq, exceeds an experimentally determined threshold.

Figure 11:
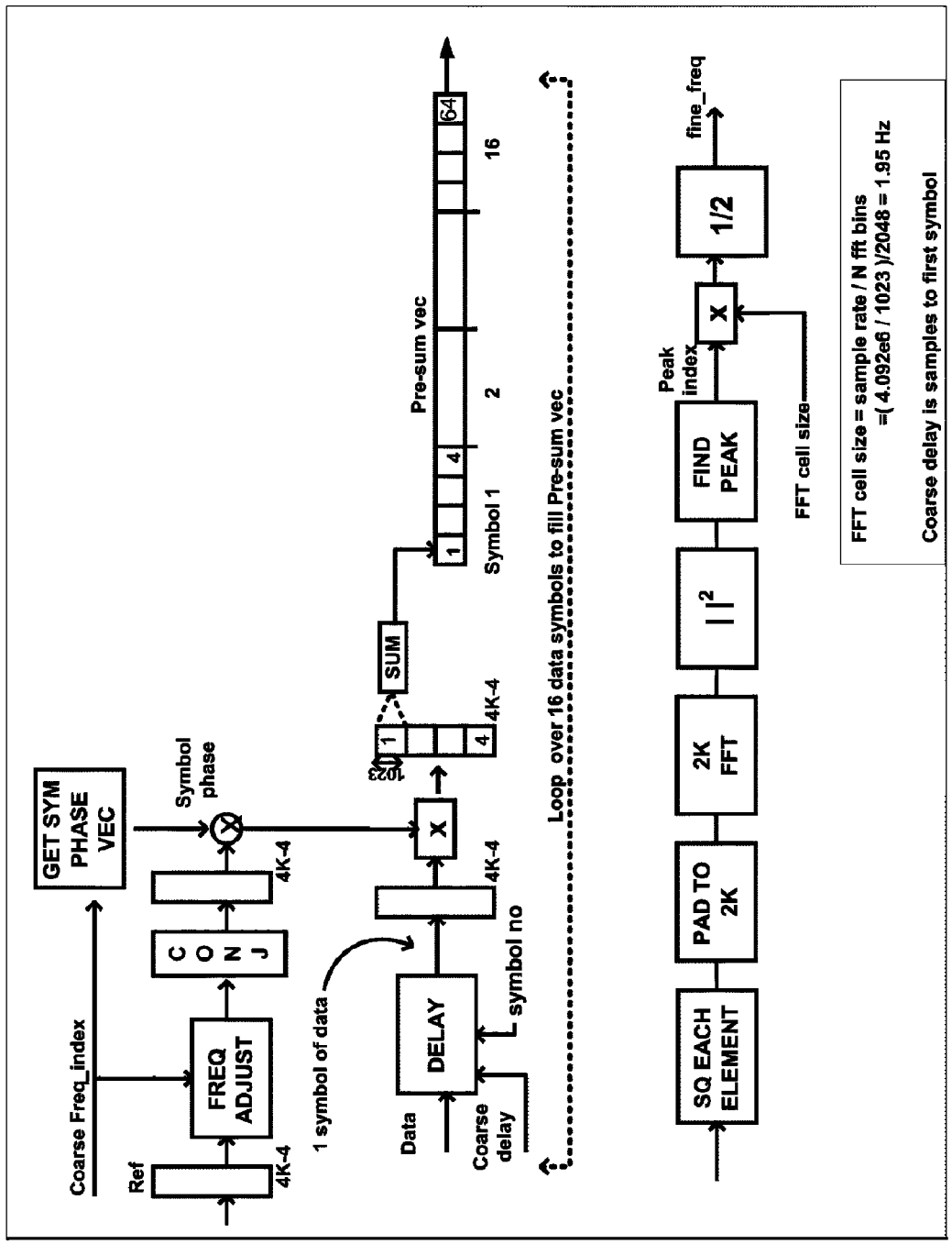
FIG. 11 illustrates a process for estimating fine frequency using coarse frequency and coarse delay according to an embodiment of the present invention.

Referring to FIG. 11, get_fine_freq is entered if max_pwr_2, from get_coarse_delay, exceeds an experimentally determined threshold. At this point, coarse_freq_index and coarse_delay are known. Thus, symbol boundaries in samples can be identified within Data. Code modulation is removed by multiplying each symbol by a reference, adjusted by the coarse freq, and by a phase adjustment. The latter is necessary to remove phase discontinuities between frequency adjusted references. This process uses 16×4092 Data samples or about 16 symbols. The process for correcting the reference, Ref, for frequency and phase is:

coarse_*freq*=1000*(1023/1024)*coarse_*freq*_index;

*del*=coarse_*freq*/4.092E6;

Freq_correction_*vec*=exp($i$*2*$pi$*$del$*(1:4092));

Sym_phase_*corr*_*vec*=exp($i$*2*$pi$*(1:16)*4092*$del$);

Ref_*freq*_*n*_phase corrected=Sym_phase_*corr*_*vec* (symbol_number)*Freq_*corr*_*vec*.*Ref*;

What remains, after multiplying each symbol by a reference, is 16 symbols of data, with code modulation removed, frequency modulated by fine_freq: the difference between the coarse frequency and the measured frequency. Next, each 4092 sample symbol is divided into fourths; each 1023 sample sub-symbol is summed and the result placed in the Pre-sum vector. This vector has 16×4092/1023=64 elements. Each element of the 64 element Pre_sum_vec is squared, to remove bit transitions. An alternative is to double the phase of these complex numbers. The vector is padded to 2K and its FFT taken. Then the magnitude squared of each element is taken and the index of the peak element, peak_index, is found. If the peak_index exceeds 2K/2, the fine freq is negative and peak_index=peak_index−2K. The FFT cell size (frequency resolution) is the ratio of the sample rate (4.092 MHz/1023) to the number of FFT bins (2K) or 1.95 Hz. Since the squaring operation has the effect of doubling the frequency, the computed fine frequency is halved at the end of this function. Thus, fine_freq=(½)*peak_index*1.95 Hz.

Finally, at the end of the acquisition section, the measured frequency is measured_freq=R×(coarse_freq_index)+fine_freq where R=1000×(1023/1024) Hz.

Alternatively, one skilled in the art recognizes that other sizes of data windows and FFT pad lengths are possible and are within the scope of the present invention.

Figure 12:
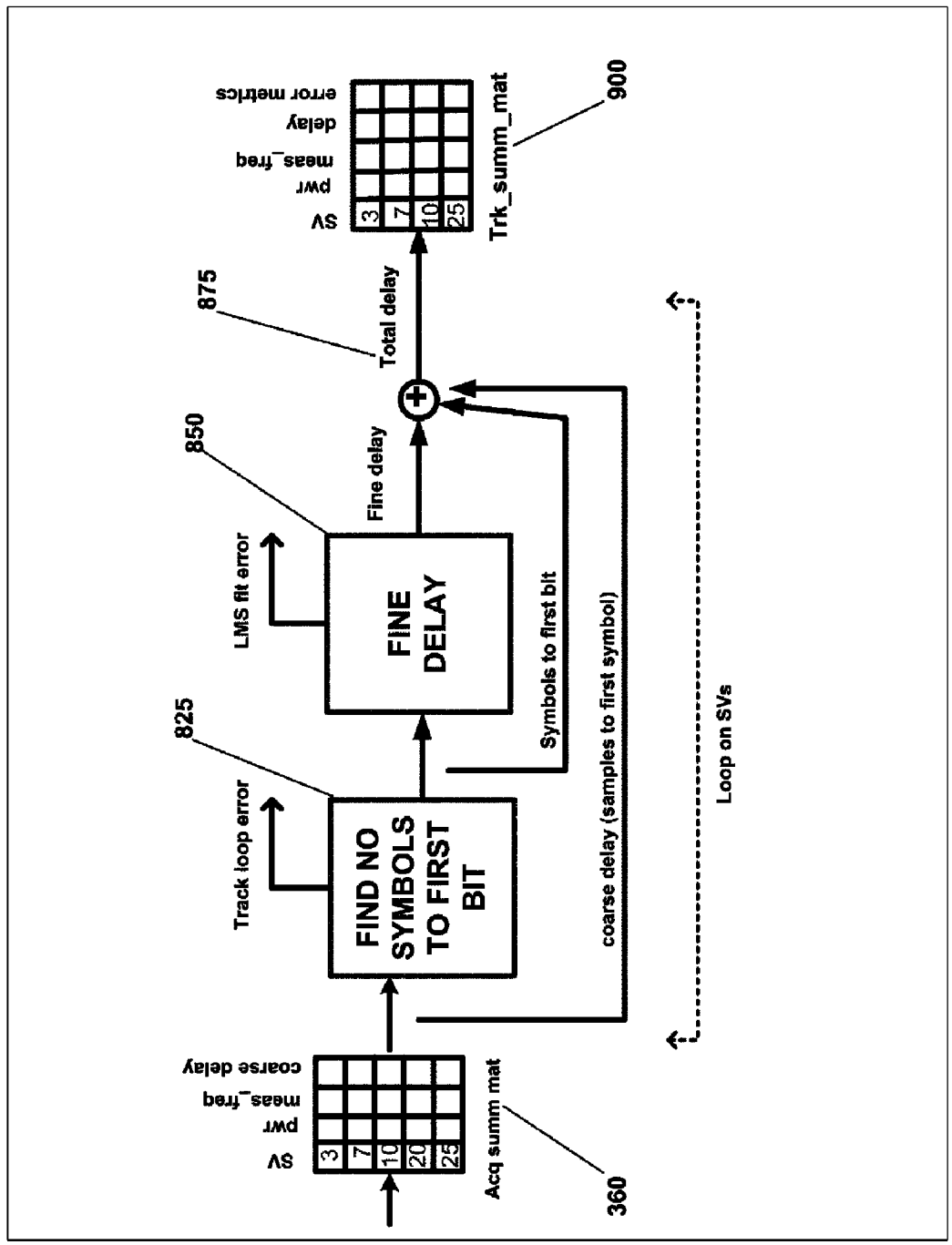
FIG. 12 illustrates a general process for computing the total delay according to an embodiment of the present invention.

FIG. 12 outlines the track processing function of the invention. The input is the matrix Acq_summ_mat 360, containing meas_freq and coarse_delay (samples to first symbol) for each SV detected. The goal here is to estimate delay, defined as the time from the start of data to the first bit boundary. (There are 20 symbols per bit.) The output of this process includes certain quality metrics. The process is split into two parts:
 1. Find the number of symbols to the first bit boundary (no_sym_first_bit) 825.
 2. Make an estimate of fine delay 850.
By finding the number of symbols to the first bit boundary, the data can be segmented into bits. The fine delay for each bit is computed; thus bit transitions are irrelevant. Finally, an estimate of fine_delay is made by a least mean square (LMS) fit to the set of bit delays. The delay estimate output, e.g., total delay 875, from the track process is the sum of:
 1. coarse_delay,
 2. no_sym_first_bit,
 3. fine_delay.
The matrix, TRK_summ_mat 900, contains this result.

Figure 13:
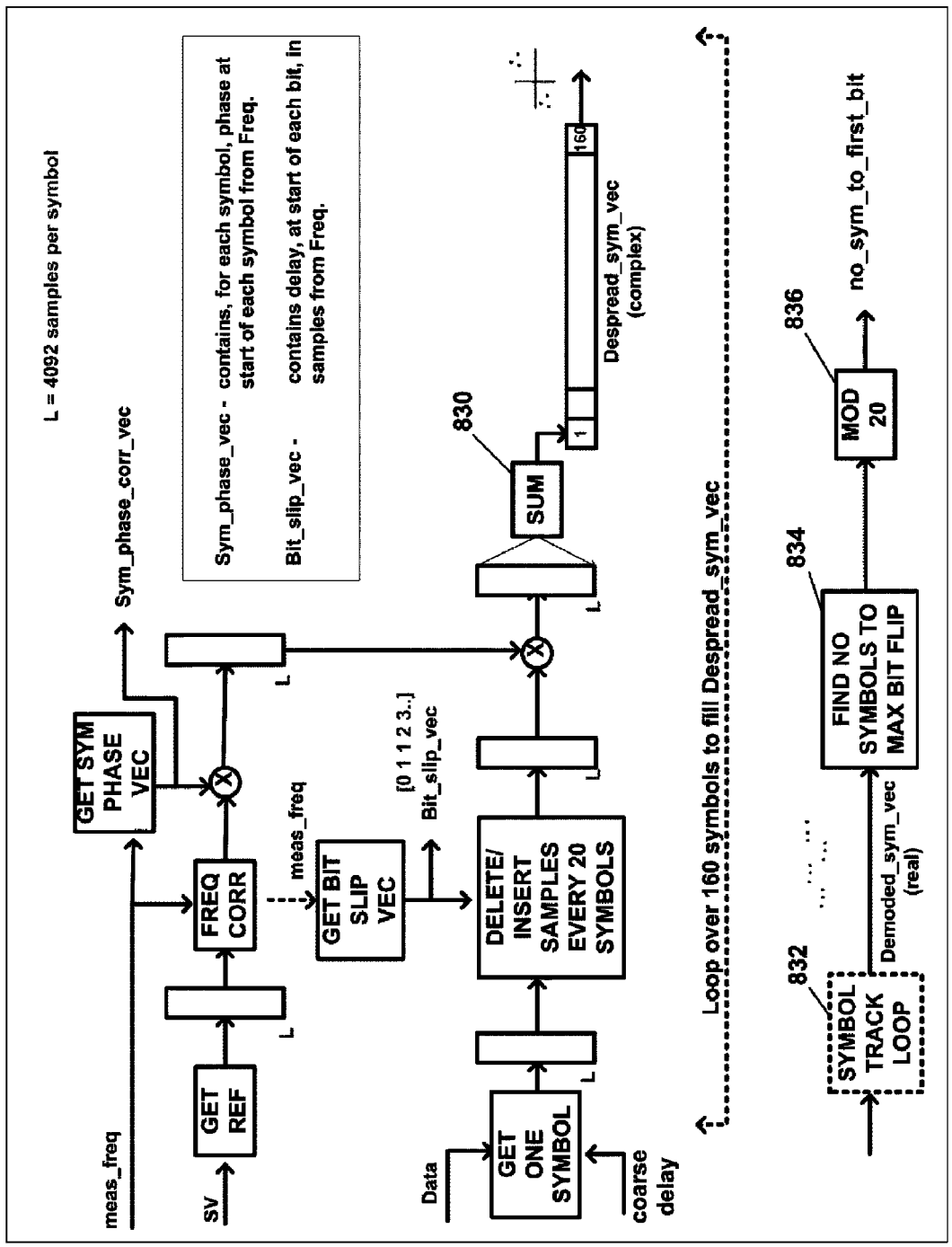
FIG. 13 illustrates a process for finding the number of symbols to the first bit boundary according to an embodiment of the present invention.

FIG. 13 illustrates a detailed example of the processing to find the number of symbols to the first bit boundary (825 from FIG. 12). Each symbol (4096 samples long), is despread by multiplication with a frequency and a phase adjusted reference and then summed 830. The despread symbols are demodulated with a tracking loop 832 (see FIG. 14) to produce real values. Next, the largest bit transition is found 834; this value, modulo 20 836, is the number of symbols to the first bit boundary (no_sym_first_bit), where there may or may not be a bit transition.

The process for correcting the reference, Ref, for frequency and phase is similar to that of get_fine_freq, except that coarse_freq is replaced by meas_freq.

del=meas_freq/4.092E6;

Freq_correction_vec=exp(i*2*pi*del(1:4092));

Sym_phase_corr_vec=exp(i*2*pi*(1:16)*4092*del);

Ref_freq_n_phase corrected=Sym_phase_corr_vec
 (symbol_number)*Freq_corr_vec.*Ref;

There occurs a slippage of the signal code chips relative to reference code chips, due to apparent chip rate error. This chip rate error is the apparent carrier frequency offset scaled down to the nominal chip rate. The apparent carrier frequency offset is the combined effect of Doppler shift and RF front end clock error. These two are additive and indistinguishable.

The chip rate error causes delay, relative to a reference, to precess linearly as one moves deeper into the collected data. This linearly changing delay causes the reference and data to become more and more misaligned, thus reducing processing gain. This delay is $1/F_{L1}$=0.6348 ns per Hz of apparent carrier frequency offset, per second into data, where $F_{L1}$=1575.42 MHz, the GPS L1 carrier frequency. The Bit_slip_vec_samp is this delay, in samples, at 20 symbol (one bit) intervals, and is given by:

TIME_SLIP_FROM_DOPPLER=0.6348$E$−9; Slip in sec per Hz per sec.

slip_per_bit_sec=−
 TIME_SLIP_FROM_DOPPLER*meas_freq*0.020; Bit slip per bit in sec.

Bit_slip_vec_sec=cumsum(slip_per_bit_sec*ones(1, 8)); Bit slip vector, in sec.

Bit_slip_vec_sec(1)=0;

Bit_slip_vec_samp=round(4092e6*Bit_slip_vec_sec); Bit slip vector in samples.

So to minimize the misalignment due to chip rate error, samples are inserted or deleted, every 20 symbols, as defined by the Bit_slip_vec.

Figure 14:
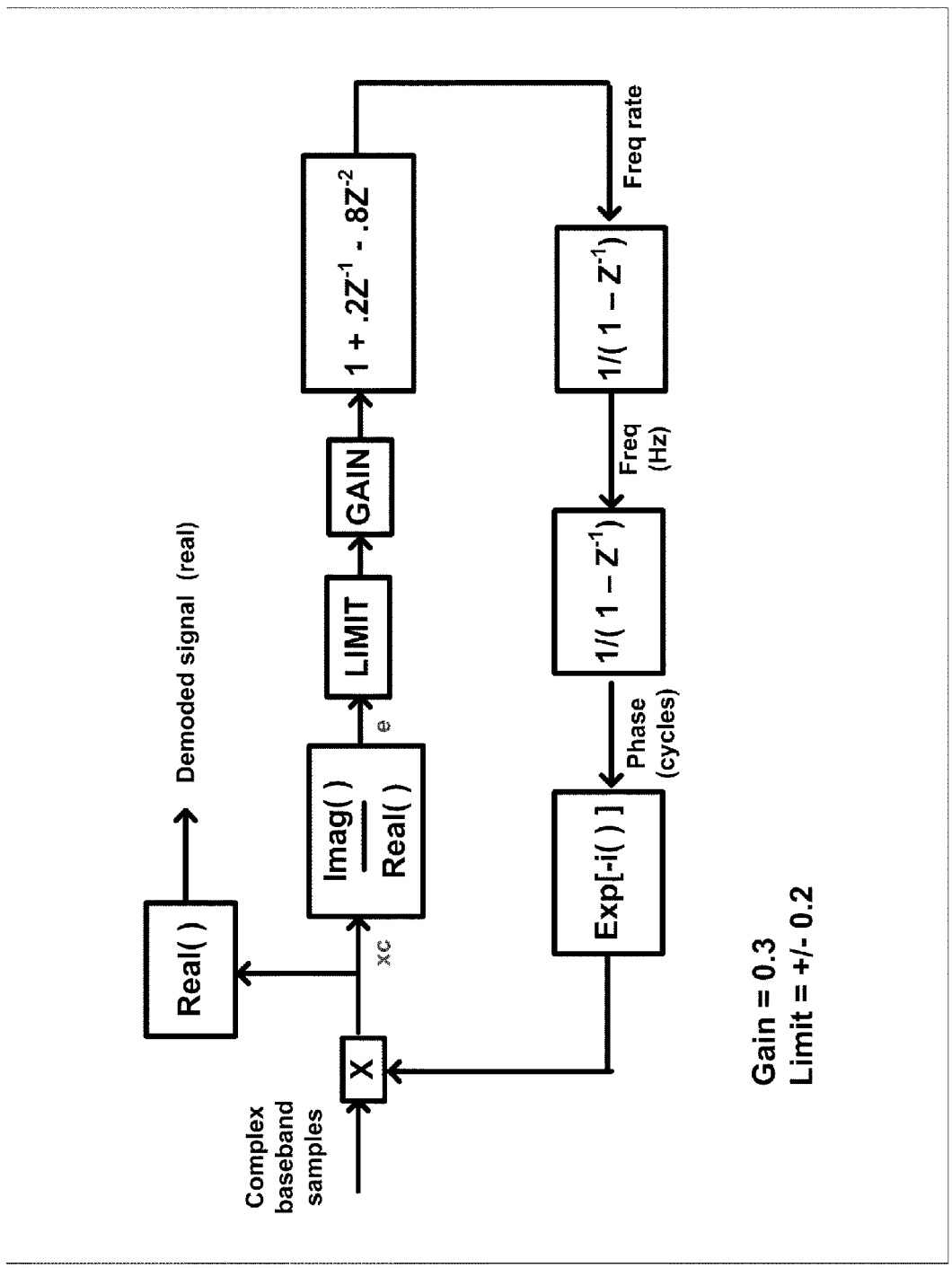
FIG. 14 illustrates a track loop used to demodulate the despread symbols from FIG. 13 according to an embodiment of the present invention.

FIG. 14 shows the track loop used to demodulate the despread symbols. It is a simple third order loop (2 integrators). This loop attempts to drive the phase, of the phase corrected incoming symbols, to zero. The loop error signal is the ratio of imaginary to real parts of the phase corrected input. This is approximately the angle of the phase corrected input with the real axis. Note this error signal is not affected by bit transitions (180° changes in incoming phase). For instance, the phase corrected inputs (x+iy) and −(x+iy) both produce the same error signal, x/y. The linear signal to noise ratio (SNR) of the demodulated signal is estimated and saved as an error metric. One skilled in the art recognizes that various tracking loop designs will achieve acceptable results and are within the scope of the invention.

At this point, the number of samples to the first symbol (coarse_delay) and the number of symbols to first bit boundary (no_sym_first_bit) are known as discussed above. Thus, Data can be segmented into bits. The process now measures fine delay for each bit and then, via an LMS fit over all bits, estimates fine_delay (850 from FIG. 12). Data is typically 8×20×4092 samples long, or about 8 bits, allowing for isolation of 7 whole bits.

Figure 15:
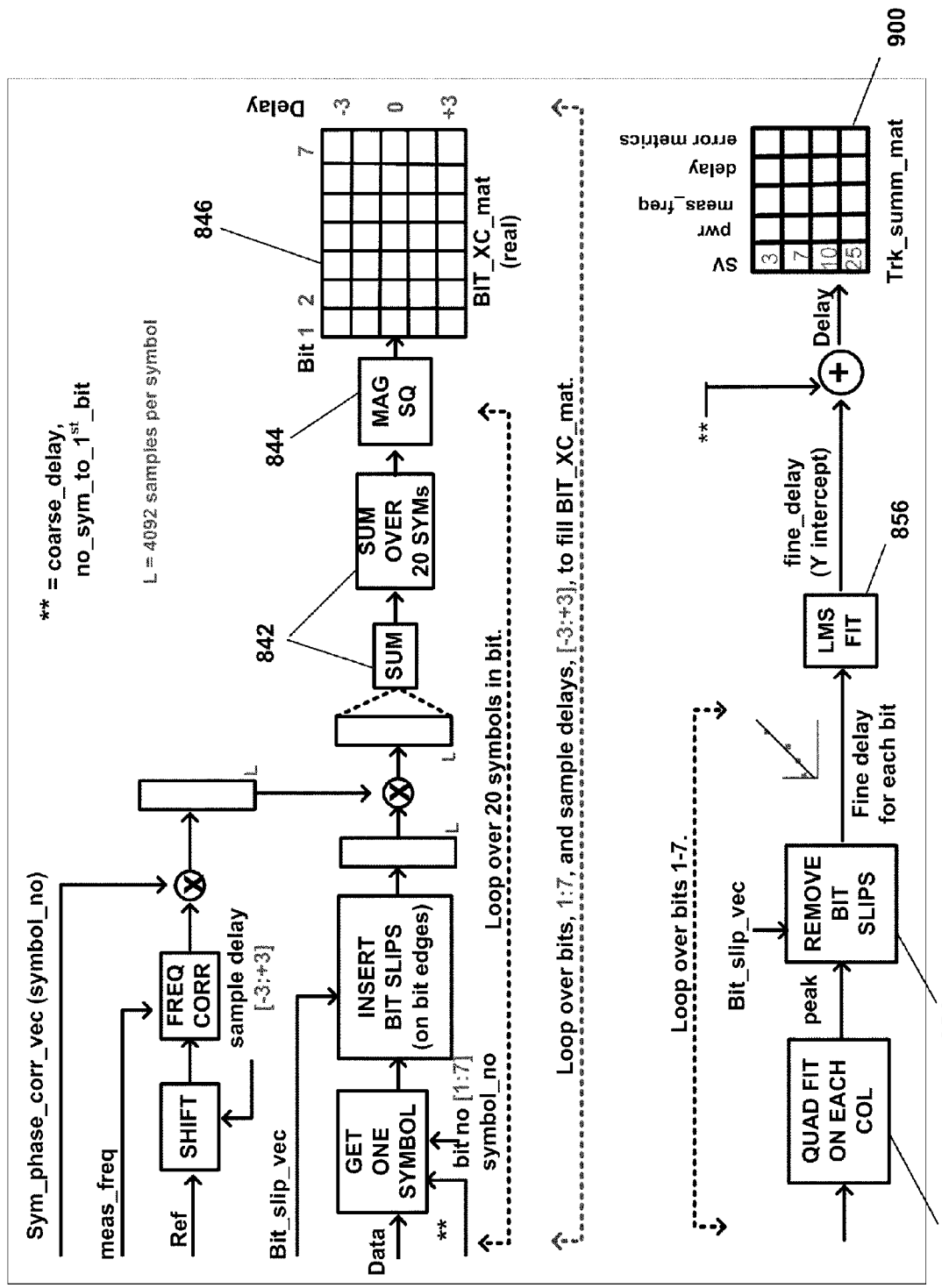
FIG. 15 illustrates a detailed process for estimating fine delay to the first bit boundary according to an embodiment of the present invention.

FIG. 15 illustrates a detailed example of the processing to estimate fine_delay (850 from FIG. 12). The central feature here is the 7×7 bit cross-correlation matrix, BIT_XC_mat 846. Each element contains the magnitude squared 844 of the sum of the multiplication of a 1-bit (20 symbol) reference with a bit of data 842. The columns of the BIT_XC_mat correspond to whole bits [1:7]; the rows correspond to delays [−3:+3]. So each column contains 7 samples of the XC of a 1-bit reference with 1 bit of data, in the vicinity of the XC peak. For each column (bit) of BIT_XC_mat, a parabolic fit is made to the peak element in that column and its two nearest neighbors. The peak of this parabola is the estimate of fine delay for that bit. Other peak identification methods are within the skill of the art. Moving from bit to bit, delay changes linearly due to chip rate offset, as described in the last section. Since delay for each bit is different; an overall delay estimate is needed. Here fine_delay is defined as the y-intercept of an LMS fit 856 to the set of 7 measured bit delays. Thus fine_delay is referred back to the start of Data. Alternatively, a higher order fit is possible and within the scope of the invention.

Then delay to the first bit boundary is estimated as the sum of:
1. coarse_delay (samples to $1^{st}$ symbol),
2. no_sym_first_bit,
3. the fine_delay estimate discussed in this section.

The sum of these is the delay estimate that is the output of the track process.

The slope of this LMS fit is related to apparent carrier frequency offset, which can be estimated as:

slope_ns_per_20 ms=slope; Slope in ns per 20 ms.

slope_sec_per_sec=(1e-9/20e-3)*slope_ns_per_20 ms; Slope in *sec* per *sec*.

dopp_from_1s_fit=-CARRIER_FREQ*slope_sec_per_sec; Estimate of apparent carrier *freq* offset from slope of LMS fit.

This should agree with the frequency measured in the acquisition section. The difference between these two estimates of apparent carrier frequency offset is saved as an error metric. Each element of the BIT_XC_mat 846 corresponds to the multiplication of a particular bit of data with a delayed reference, followed by summation. To minimize storage, each element is built a symbol at a time. And each symbol reference is adjusted by the Sym_phase_vec, as in the last section, to avoid phase discontinuities.

As before, the Bit_slip_vec is used to insert/delete samples on bit edges. This keeps the XC peak contained within a 7 element column on the BIT_XC_mat. Otherwise this matrix would need more elements in each column, thus requiring more processing to fill. Note that these bit slips are removed 854, as again defined by the Bit_slip_vec, after the quadratic fit 852.

The processes described with respect to FIGS. 12 through 15 are repeated for each SV in the Acq_summ_mat 360. The estimated delay and error metrics are saved in the Trk_summ_mat 900.

The error metrics saved in the $Acq_{13}$ summ_mat are:
1. Peak-to-mean ratio (PMR) which is the ratio of the peak element in the AM in get_coarse_delay to the average over the elements of this AM (a measure of signal to noise ratio for this SV),
2. Frequency Error which is the difference between measured_freq from acquisition and the carrier frequency offset from the slope of the LMS fit to bit delays,
3. Delay Error which is the RMS (root-mean-square) error in the least mean squares (LMS) fit across the set of seven bits,
4. Track SNR which is the linear SNR of the demodulated signal from the symbol tracking loop.

The variance of a delay estimate, via coherent integration, goes as 1/M where M is the number of independent samples. And the variance of an LMS estimate of y-intercept, goes as 1/N, where N is the number of samples in the LMS fit, e.g., 7.

Accordingly, the subject method of estimating delay for each of 7 bits and then combining these with an LMS fit is equivalent to estimation of delay by coherent integration over all 7 bits.

To this point, all processing has occurred at the DRT. The track summary matrix 900 includes tracking information for each SV in view. In a preferred embodiment of the present invention, a determination is now made regarding what information, i.e., information for which SVs, is to be uploaded to the ground station. Accordingly, an upload filter is used to: determine which of the tracked SVs to upload to the ground station; reduce the precision of the delays to a predetermined number of bits; and assemble the binary message to be uploaded.

The binary message to be uploaded will contain, for each SV, a five bit satellite number and twenty-one bits to represent the delay in milliseconds (one sign bit and twenty bits for the delay). A maximum of five SVs will be uploaded. Twenty bits, plus a sign bit, and five SVs have both been determined experimentally to give the most accurate results with the fewest bits and SVs.

Figure 16:
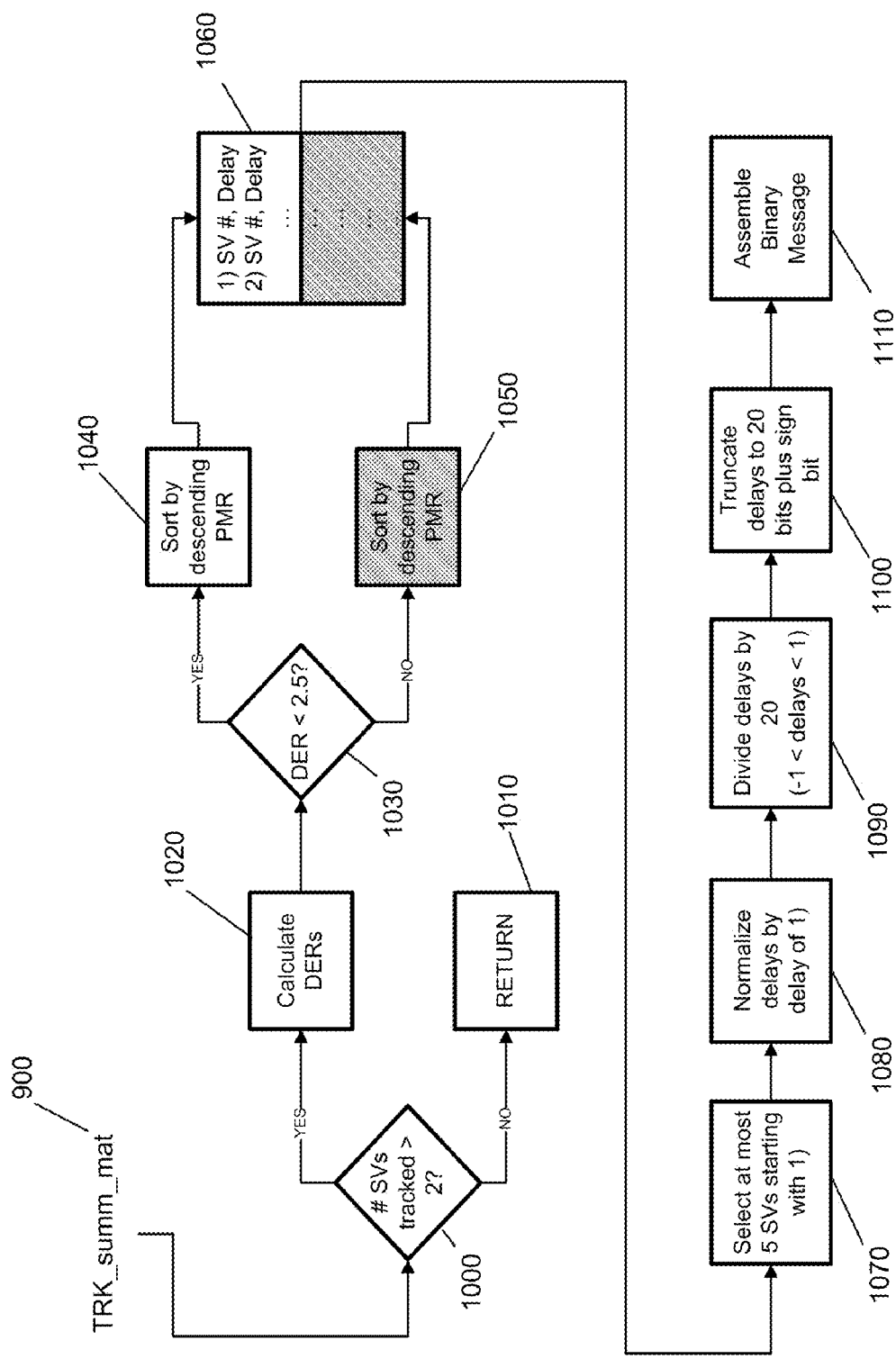
FIG. 16 illustrates a process for selecting SVs and associated delays, and assembling the binary message for transmission, according to an embodiment of the present invention.

Referring to FIG. 16, determining which SVs to upload is accomplished by using two of the error metrics saved in the TRK_summ_mat 900: PMR and delay error. The ratio of the delay error for each satellite to the median delay error of all the satellites tracked is then calculated. It has been found experimentally that SVs with the highest PMR and a delay error ratio (DER) less than 2.5 are most likely to produce a geo-location solution and the lowest geo-location CEP. The SV selection process also utilizes PMR, peak-to-mean ratio, which is a measure of signal-to-noise. The SVs from TRK-_summ_mat are sorted according to whether their DER is less than 2.5 or not and then ordered according to descending PMR.

More particularly, in a preferred embodiment of the present invention, SVs are selected in accordance with the process exemplified in FIG. 16. Initially, if two or fewer satellites are tracked 1000, no message is transmitted 1010. It is not possible to calculate a geo-location estimate with less than three SVs and accordingly it would be a waste of energy to transmit a message with information for fewer than three satellites. When three or more SVs are tracked 1000, the process proceeds as follows:
  a. Calculate DER 1020
  b. Identify SVs with delay error less than 2.5 1030
  c. Sort results of (b) and (c) according to descending PMR 1040, 1050
  d. List results with 1) being SV with highest PMR with DER under 2.5 1060
  e. Select at most five SVs with the highest PMR and a DER less than 2.5 1070.
  f. If at least five SVs with a DER less than 2.5 have not been tracked, then any satellites with a DER greater than 2.5 will be appended to the bottom of the list of chosen SVs, also in PMR order, until five SVs have been selected. 1060

By putting SVs with DERs greater than 2.5 at the end of the selected SV list, the GLP will know where to start excluding SVs if a geo-location solution cannot be found. The delays from these SVs are the most likely to be inaccurate.

In the final step, the binary message is assembled as follows:
  1. Because only the relative difference in delays between SVs is important, the values of all the delays are normalized to that of the first SV 1080. That is, we subtract the delay of the first SV from all of the other delays. Since the delay of the first SV is now 0, it does not have to be uploaded, only its five bit SV #.

2. Each delay is divided by 20 to put it in the range −1<delay<1 because this was found to be a more efficient use of bits than using a fixed point representation 1090. Alternatively, fixed point representation may be used depending on system constraints, e.g., the amount of energy expended and the channel characteristics.

3. Next, the delays corresponding to the SVs chosen are reduced to the predetermined number of bits (twenty plus a sign bit) 1100. These twenty one bits represent the delay between −1 and 1, resulting in a precision of about 19.1 ns ($2^{-20}*20*10^{-3}$, where the second term is because the delays were divided by 20 and the third term arises from the fact that the delays are calculated in milliseconds).

4. Finally, the binary message for the selected SVs is assembled 1110. For each of the SVs besides the first, there are five bits for the SV #, one sign bit, and twenty bits for the delay, in that order. The first bit for the SV # of the third SV would start after the last bit of the second SV's delay.

Figure 17:
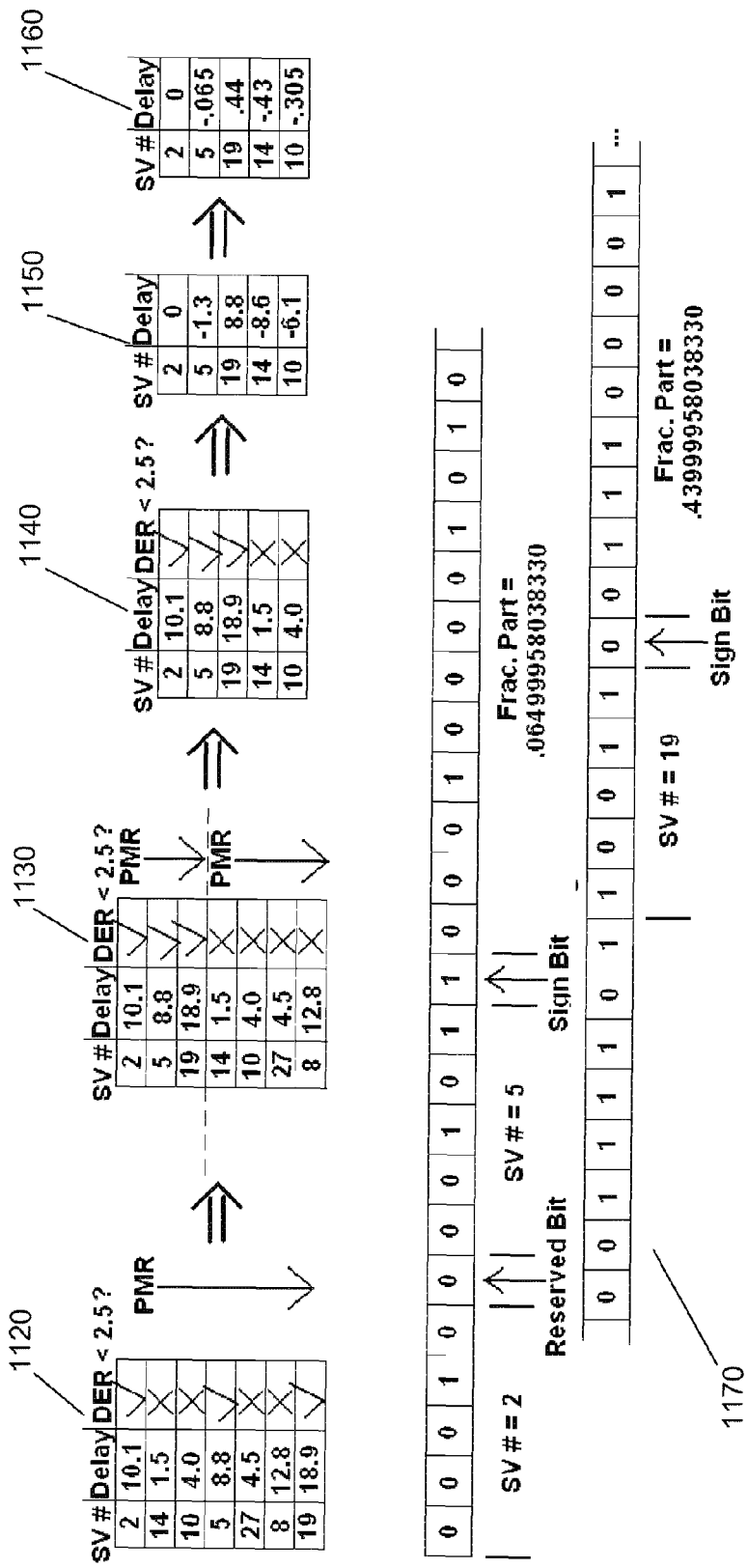
FIG. 17 illustrates an example of the process illustrated in FIG. 16.

FIG. 17 exemplifies the SV selection process using exemplary data. More specifically, the first table 1120 shows all of the satellites tracked, their delays, and status of DER, i.e., less than 2.5 receives a check. Table 1130 shows the SVs sorted by whether DER is less than 2.5 and then by descending PMR. Table 1140 is truncated to the top five SVs. In table 1150, all of the delays are normalized to the value of the first SV's delay. And, finally, in the last table 1160, the delays are all divided by 20 to put them in the range −1<delay<1. Binary message 1170 illustrates the beginning of the 110-bit binary message that would be transmitted for this particular example. The SV number of the first SV is followed by a reserved bit, then the SV number of the second SV, a sign bit for its delay, and then the delay, truncated to twenty bits. This delay extends to the next line where it is followed by the SV number of the third SV, the sign bit for its delay, and the beginning of its delay. This pattern would be extended for up to 5 selected SVs. The transmitted binary message can be referred to as the Remote Data Set. Importantly, the Remote Data Set includes only a set of relative GPS signal delays and associated SV identification numbers. This is different from a conventional GPS receiver which spends time and energy demodulating the Navigation Message from each SV in view.

Figure 18:
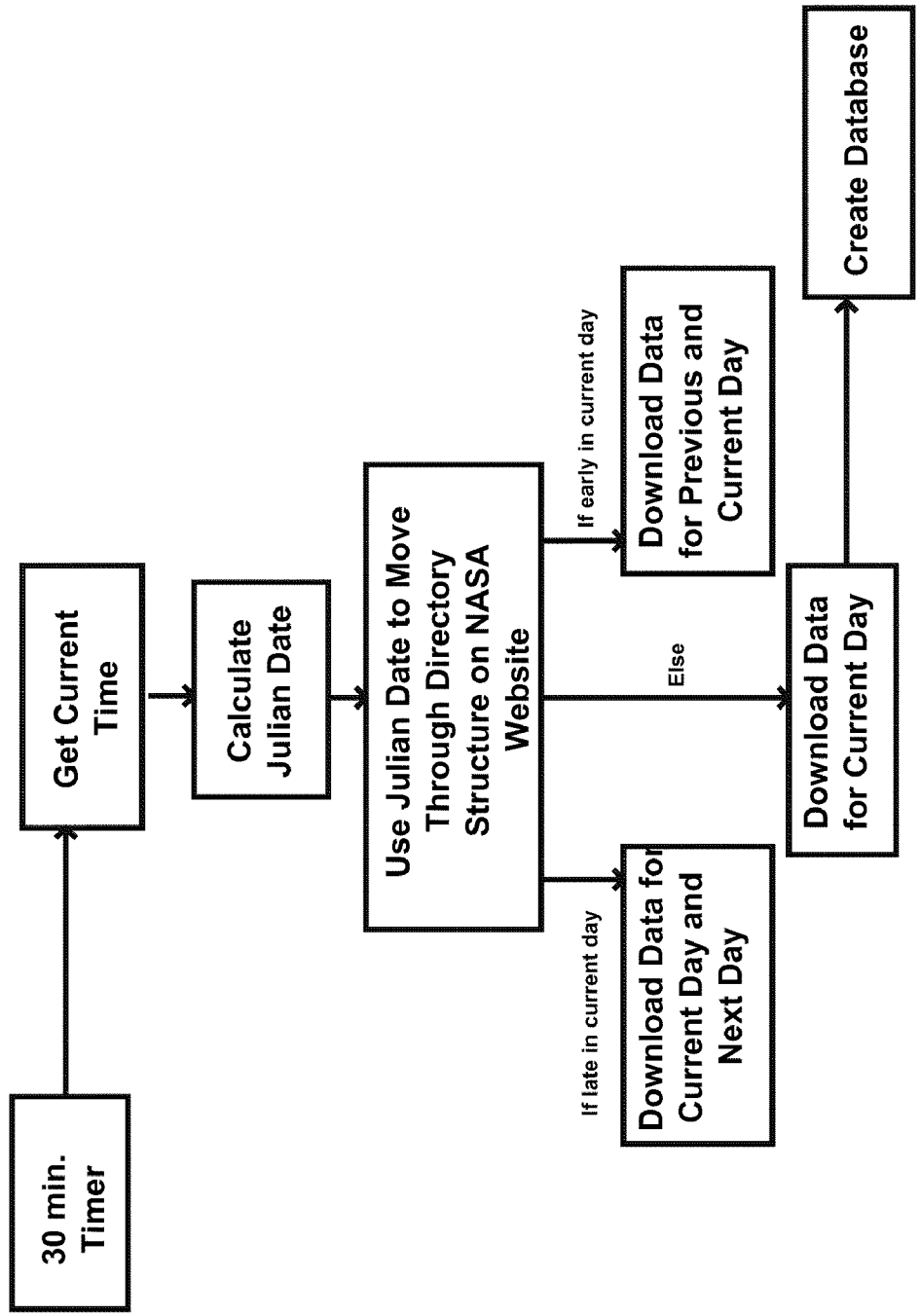
FIG. 18 illustrates a process for populating the navigational database according to an embodiment of the present invention.

Referring back to FIG. 3, all prior processing has occurred at the DRT 100. The Remote Data Set is now transmitted to a ground station 140 and then to the GLP 150 which includes geo-location software (GLS) 170 and a Navigation Message database (NMD) 160. The NMD 160 can be populated and updated using information from passing SVs via a commercial GPS receiver or via an internet connection to a remote source, e.g., NASA public FTP site. In the present embodiment, the system collects navigation data by using MATLAB to query a NASA FTP database (ftp://cddis.gsfc.nasa.gov/gps/data/hourly/). This database contains hourly ephemeris reports for all operational SVs. FIG. 18 outlines the process used to populate and update the NMD. The process is implemented in MATLAB running on an appropriate computing system, but other computational software may be used. The program maintains a timer function, which starts an ftp download every 30 minutes. The ephemeris files are stored on the NASA site in RINEX (Receiver Independent Exchange) format, and are stored in directories that are labeled by time of day for which the ephemeris is valid. Ephemeris is typically valid for two hours. Therefore there are times of day, particularly very early or late in the day during which some SVs are transmitting ephemeris which is valid for the previous or next day. Because of this, often times there are two RINEX files which need to be downloaded instead of only one.

Once the current time is acquired it is converted to Julian day, due to the directory structure on the NASA website. Once the current Julian date is calculated, along with the next or previous day's date (if necessary) the directory structure can be traversed, and the RINEX files can be downloaded.

Once the files are downloaded, they are uncompressed, read by the RINEX loading and reading software, and then stored into a useable database format. We make two identical files, one called log.txt and the other containing a time stamp in the filename. The log.txt file allows for easy real-time processing, where the software will need only look for the most recent database file, and the time stamped file helps with the post-processing of large amounts of data.

Figure 21:
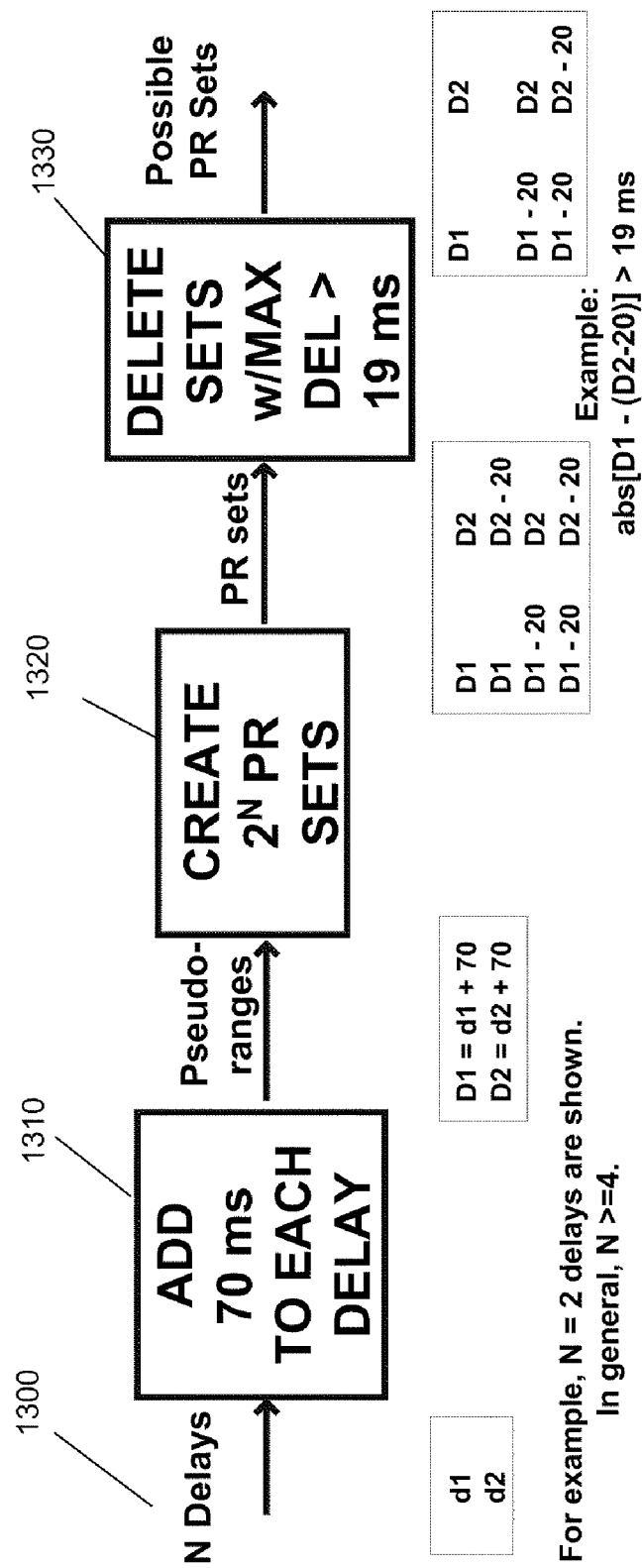
FIG. 21 illustrates a method for processing uploaded delays to determine pseudoranges and eliminate ambiguous values according to an embodiment of the present invention.

FIGS. 19a and 19b show GLS inputs and processes. Referring to FIG. 19a, the GLS 170 receives information inputted from at the SV and corresponding delay information from the ground station 140 and the current Navigation Message data, i.e., ephemeris data, from the NMD 160. More particularly, referring to FIG. 19b, the GLS via the GLP performs the following processes steps: reads the RDS including SV numbers, time of arrival, and time delay to first bit boundary in SNR order 1200; calculates GPS data collection time at DRT by subtracting the fixed processing time at the DRT and communications latency from the time of arrival of the RDS 1205; reads ephemeris data from the Navigation Message file 1210; checks for 3 or more SVs from the DRT with healthy ephemeris data 1215; accounts for the delay ambiguities by generating possible PRs 1220 (see FIG. 21); computes a possible position estimate, i.e., perform geo-location, and outputs position 1225; checks to see that computed position estimate is within altitude range, e.g., 0 to 1700 meters, and if so accepts solution as correct 1230. If the solution is not within the altitude range, the GLS repeats step 1225 with a different set of PRs. And if no position estimate meets the altitude criteria, the SV with the lowest SNR is deleted and the process repeated. A more detailed description of the GLS process and algorithm is described below with respect to FIG. 22.

Figure 20:
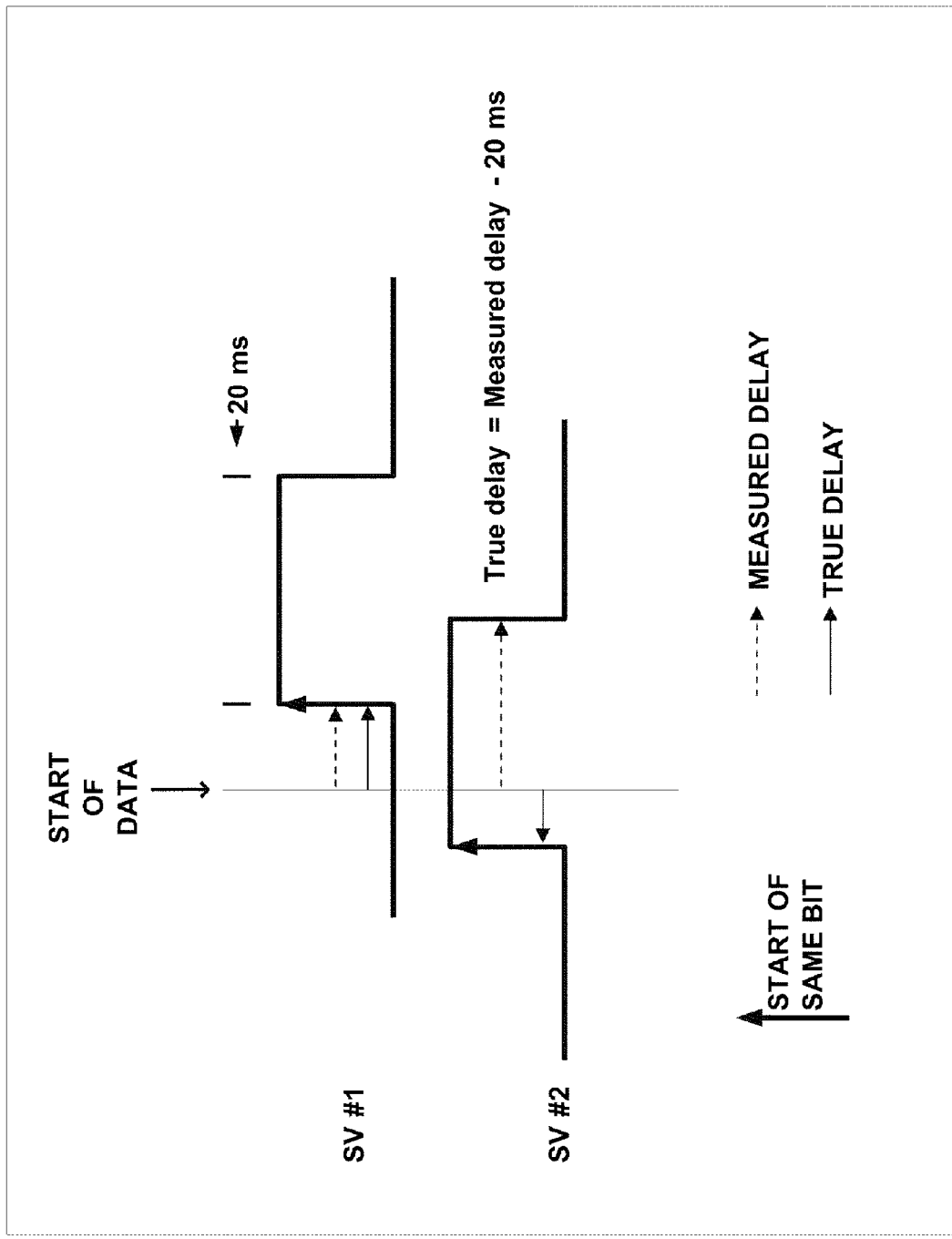
FIG. 20 illustrates the 20 ms delay ambiguity inherent in the embodiment of the present invention.

In order to compute location of the DRT, the GLP 150 needs a set of delays to the same bit boundary. As discussed above, the track section of DRT GPS processing, estimates the delay to the first bit boundary in the data set, a positive number. As illustrated in FIG. 20, the delay to a bit boundary can be negative; i.e., it could be the measured delay minus 20 ms. So for each delay measured, there are actually 2 possibilities: the measured delay and that delay minus 20 ms. So, for example, for four SVs (four measured delays), there are then 16 possible sets of four delays each. Not all sets of delays are possible. The maximum possible difference between any pair of a set of delays is about 19 ms. (Total path length from a GPS SV can range from 67 to 86 ms.) So a set of four delays can be eliminated if maximum delay of the set minus the minimum delay exceeds 19 ms . . . . Accordingly, delays are processed by the GLS in accordance with FIG. 21 as follows. The N delays to the first bit boundary, all >=0: $[d_1 d_2 \ldots d_N]$, from the DRT are transmitted to the GLP 1300. The same arbitrary constant (70 ms) is added to each delay 1310:

$$[D_1 D_2 \ldots D_N] = [(d_1+70)(d_2+70)\} \ldots (d_N+70)\}].$$

The additive constant (70 ms) is chosen because it shifts these delays to be near the range of possible delays from a GPS SV to any point visible to this SV on earth: 67-86 ms. Other additive constants are possible. The error in the value of this additive constant acts like a user clock error, which becomes a dummy variable in the Geo-location Algorithm (GLA). Remembering that each delay could be actually that delay reduced by 20 ms as explained above, we create $2^N$ possible sets of pseudoranges, after multiplication by the speed of light (c) 1320. For instance 4 delays there are 16 possible sets of PRs:

| | | | | |
|---|---|---|---|---|
| $c[D_1$ | $D_2 \ldots$ | $D_{N-1}$ | $D_N$ | ] |
| $c[D_1$ | $D_2 \ldots$ | $D_{N-1}$ | $D_N - 20]$ | |
| $c[D_1$ | $D_2 \ldots$ | $D_{N-1} - 20$ | $D_N$ | ] |
| $c[D_1$ | $D_2 \ldots$ | $D_{N-1} - 20$ | $D_N - 20]$ | |
| . | | | | |
| . | | | | |
| . | | | | |
| $c[D_1 - 20$ | $D_2 - 20 \ldots$ | $D_{N-1} - 20$ | $D_N - 20]$ | |

Next, each set is tested: if abs(min-max)>19 ms, it is discarded 1330. Each of the M remaining sets of pseudoranges are input the geo-location algorithm to produce M possible position estimates as shown in FIG. 22.

Figure 22:
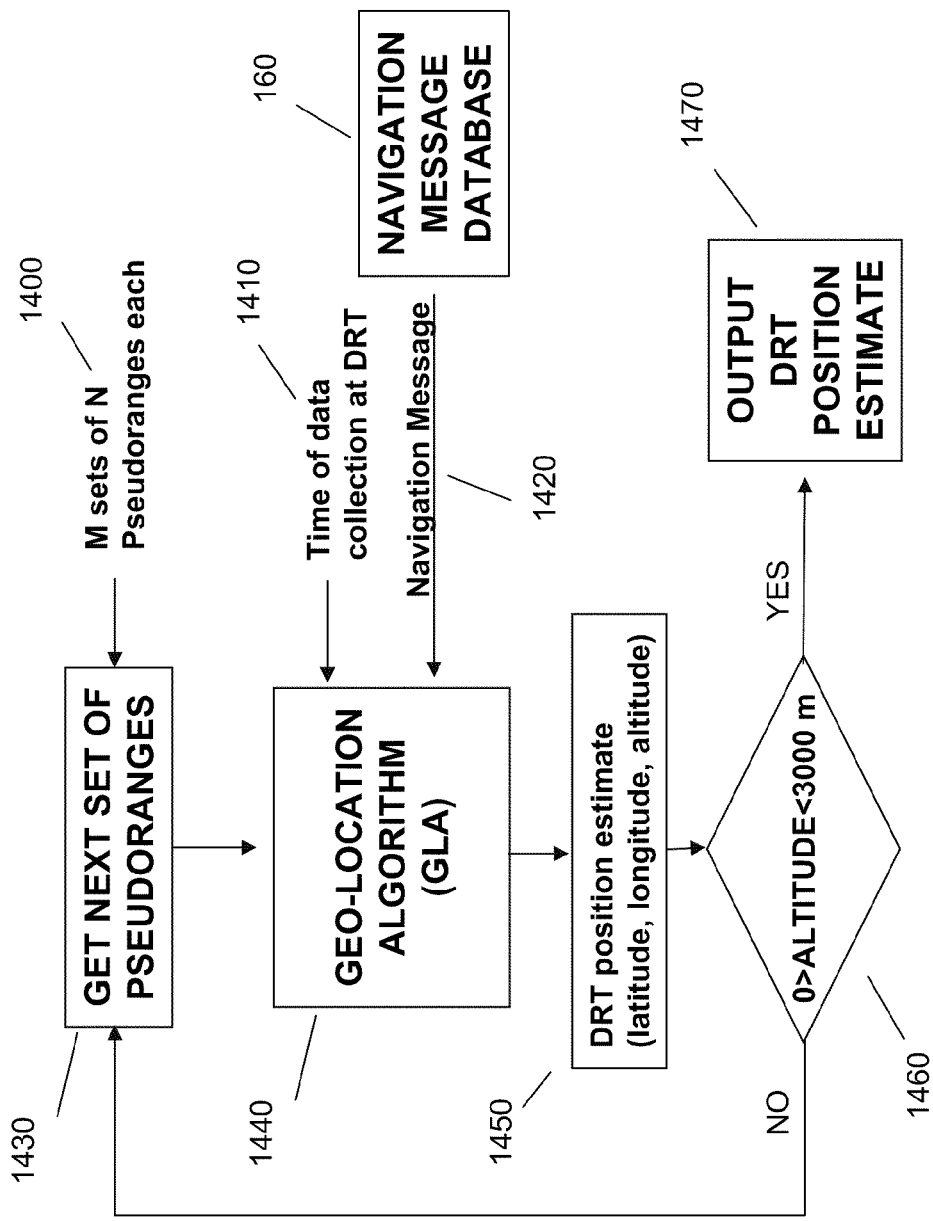
FIG. 22 illustrates a geo-location algorithm used to produce a DRT position estimate according to an embodiment of the present invention.

Referring to FIG. 22, geo-location proceeds as follows. Inputs to this process are
1. M sets of N PRs each 1400.
2. Time of data collection at the DRT 1410.
3. The Navigation Message 1420.

Stepping through the list of M sets of PRs 1430, for each set of PRs, the geo location algorithm (GLA) 1440 uses the time of data collection at the DRT 1410 and the Navigation Message 1420 to produce an estimate of the DRT's location 1450. This is in terms of latitude, longitude and altitude above sea level. If the estimated altitude is between 0-3000 m 1460, then the iteration is halted and this position estimate is output 1470. If the estimated altitude is not between 0-3000 m, the next set of PRs in input and the process repeated 1430.

In virtually all cases, only one position estimate passes the above altitude test. This is retained as the true position estimate of the DRT. In an operational system, in the rare event that more than one position estimate passes the altitude test, prior position data may be used to make a reasonable choice. One skilled in the art recognizes that 1700 is an arbitrary upper limit which can be varied.

As discussed, the GLA uses a set of PRs, the time of data collection and the Navigation Message to produce an estimate of the DRT's location. This algorithm can be one of several described in various text books (See, for example, Fundamentals of Global Positioning System Receivers—A Software Approach, Second Edition, James B. Tsui, 2005 Wiley-Interscience) or found in commercially available software packages. The current embodiment uses a commercially available software package from GPSoft LLC.

In an alternative embodiment, the DRT measures delay to the first symbol (GPS code epoch). The total PR then would be that delay plus an unknown number of 1 ms intervals between the SV and the DRT; e.g., the measured delay to the first symbol is the total delay to the SV, modulo 1 ms. The total delay is then the measured delay to the first symbol boundary plus an integer number of 1 ms intervals, between 67 and 86 ms (the range of possible delays from any location on earth to a GPS SV in view). This alternative method would then iterate over possible combinations of measured delays plus 1 ms intervals between 67 and 86 ms. As with the current method, the geo-location solution whose altitude is between 0 and 1700 m is accepted as correct.

Additional data processing techniques are contemplated by the invention. Methods to reduce the number of transmitted bits would further reduce energy consumption. For example, removing a number of the most significant bits (MSBs) of the delays means that the DRT is transmitting fewer bits. Leaving off bits simply increases the number of possible solutions that must be tried at the ground station. The number of possible solutions would be $2^{\wedge}(\# \text{ MSBs left off} * \# \text{ of delays})$. For example, if we left off a single most significant bit from each of four delays, we would have $2^{\wedge}(1*4)=16$ possible delay sets to iterate over. It is possible to use a branch algorithm to eliminate groups of possibilities at a time so the total number of possibilities would rarely be checked, speeding up the search.

While this invention addresses GPS signals, the methods described here can be used to acquire and measure delays among signals whose structure is similar to GPS signals; that is signals which are bi-phase modulated, with each bit interval consisting of repeated code epochs.

We claim:

1. A system for determining a position estimate for a remote asset comprising:
   at least one receiver located on the remote asset for collecting GPS signal information from multiple space vehicles and generating a signal delay for each of the multiple space vehicles, the receiver including an upload filter to select generated signal delays for transmission using predetermined criteria;
   at least one transmitter located on the remote asset for transmitting the selected signal delays;
   a ground station including a geo-location processor and a navigation database for receiving the transmitted signal delays and computing a position estimate for the remote asset.

2. The system according to claim 1, wherein the GPS signal information is transmitted from each of the multiple space vehicles at a signal frequency of 1575.42 MHz and is collected by the at least one receiver for a period of 100-200 ms.

3. The system according to claim 1, wherein the length of the collected GPS signal information is 160 ms.

4. The system according to claim 1, wherein position is estimated to 30 meters CEP (50% circular error probable).

5. The system according to claim 1, wherein the predetermined criteria are applied as follows:
   calculate a ratio of a delay error for each space vehicle to a median delay error across all of the space vehicles for each space vehicle;
   identify the space vehicles having delay error ratios less than 2.5;
   list the space vehicles having ratios less than 2.5 in order of descending signal-to-noise ratio; and
   select at most five space vehicles having the highest signal-to-noise ratio with delay error ratio less than 2.5.

6. A method for determining a position estimate for a remote asset comprising:
   collecting GPS signal information from multiple space vehicles at the remote asset, the GPS signal information being transmitted from each of the multiple space vehicles at a known signal frequency;
   extracting a signal delay for each of the multiple space vehicles;
   selecting, by an upload filter at the remote asset, signal delays for transmission using predetermined criteria;
   transmitting the selected signal delays and identification information for each of the multiple space vehicles corresponding to the selected signal delays to a ground station;
   receiving at a ground station the transmitted signal delays and identification information from the remote asset;
   retrieving information from a navigation database; and computing a position estimate for the remote asset using the transmitted signal delays, the transmitted identification information corresponding to the signal delays, the information from the navigation database, and an estimated time of data collection at the remote asset.

7. The method according to claim 6, wherein for each of the multiple space vehicles extracting a signal delay comprises:
   acquiring coarse delay and measured frequency, wherein the coarse delay is the number of samples to the next first symbol, symbol=1 ms, 1023 chip, GPS C/A code epoch, and the measured frequency is the frequency offset from the known signal frequency; and
   estimating the signal delay for each of the multiple space vehicles.

8. The method according to claim 7, wherein estimating the signal delay for each of the multiple space vehicles includes:
   determining the number of symbols to a first bit boundary; and
   estimating fine delay.

9. The method according to claim 6, wherein the predetermined criteria are at least two error metrics including delay error and signal-to-noise ratio and the method further comprises:
   calculating a ratio of the delay error for each space vehicle to the median delay error across all of the space vehicles for each space vehicle;
   identifying the space vehicles having delay error ratios less than 2.5;
   listing the space vehicles having ratios less than 2.5 in order of descending signal-to-noise ratio; and
   selecting at most five space vehicles having the highest signal-to-noise ratio with delay error ratio less than 2.5.

10. The method according to claim 9, further comprising assembling a binary message including the extracted signal delays for at most five space vehicles.

11. The method according to claim 10, wherein assembling the binary message includes:
    normalizing the extracted signal delay information for the at most five space vehicles to that of the space vehicle having the highest signal-to-noise ratio; and
    reducing the extracted signal delay information to a predetermined number of bits.

12. The method according to claim 11, wherein the predetermined number of bits is 21.

13. The method according to claim 9, wherein processing the set of signal delays for each of the multiple space vehicles comprises:
    reading the identification information for each of the selected space vehicles;
    reading the time of arrival of the signal delays at the ground station;
    reading the time delay to first bit boundary for each of the selected space vehicles;
    adding a known constant to each of the time delays to create a pseudorange for each time delay;
    calculating the GPS data collection time at the remote asset.

14. The method according to claim 13, wherein retrieving information from a navigation database includes retrieving ephemeris data for the selected space vehicles.

15. The method according to claim 14, wherein computing a position estimate comprises:
    discarding the pseudorange if abs(min-mix)>19 ms, leaving remaining pseudoranges;
    calculating M possible position estimates using remaining pseudoranges;
    comparing an altitude for each of the M possible solutions to a predetermined altitude range and selecting the solution that falls within the predetermined altitude range as the estimated position of the remote asset.

16. The method according to claim 15, wherein if more than one of M possible solutions fall within the predetermined altitude range, selecting the estimate position of the remote asset using prior position data.

17. The method according to claim 15, wherein calculating M possible position estimates using any remaining pseudoranges further includes:
    iteratively inputting time of collection of GPS signal information at the remote asset for each space vehicle associated with each of the remaining pseudoranges into a process routine;
    iteratively inputting the remaining pseudoranges into the process routine, wherein the pseudorange input includes the pseudoranges and associated space vehicle identification information; and
    iteratively inputting ephemeris data associated with each space vehicle.

18. The method according to claim 13, wherein the known constant is 70 ms.

* * * * *